US009341931B2

(12) United States Patent
Shishido

(10) Patent No.: US 9,341,931 B2
(45) Date of Patent: May 17, 2016

(54) PROJECTOR AND ILLUMINATION DEVICE

(71) Applicant: SEIKO EPSON CORPORATION, Tokyo (JP)

(72) Inventor: Yoichi Shishido, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 83 days.

(21) Appl. No.: 14/224,875

(22) Filed: Mar. 25, 2014

(65) Prior Publication Data

US 2014/0293233 A1 Oct. 2, 2014

(30) Foreign Application Priority Data

Mar. 29, 2013 (JP) .................................. 2013-071589
Jan. 30, 2014 (JP) .................................. 2014-015225

(51) Int. Cl.
*G03B 21/20* (2006.01)
*H04N 9/31* (2006.01)

(52) U.S. Cl.
CPC .......... *G03B 21/2013* (2013.01); *G03B 21/208* (2013.01); *G03B 21/2053* (2013.01); *H04N 9/3152* (2013.01); *H04N 9/3155* (2013.01); *H04N 9/3164* (2013.01)

(58) Field of Classification Search
CPC ................................................. G03B 21/2013
USPC .......................................................... 353/97
See application file for complete search history.

(56) References Cited

U.S. PATENT DOCUMENTS

| 2002/0033904 A1 | 3/2002 | Yamamoto et al. |
| 2008/0259284 A1 | 10/2008 | Maeda et al. |
| 2009/0323034 A1* | 12/2009 | Kimura |
| 2011/0037954 A1* | 2/2011 | Tsuchiya et al. ................. 353/54 |

FOREIGN PATENT DOCUMENTS

| JP | A-2002-90877 | 3/2002 | |
| JP | A-2002-101423 | 4/2002 | |
| JP | A-2004-69966 | 3/2004 | |
| JP | A-2007-293274 | 11/2007 | |
| JP | A-2008-287209 | 11/2008 | |
| JP | A-2010-91772 | 4/2010 | |
| JP | 2010-107864 | * 5/2010 | ............. G03B 21/14 |
| JP | A-2010-107864 | 5/2010 | |
| JP | A-2011-95292 | 5/2011 | |

* cited by examiner

*Primary Examiner* — William C Dowling
*Assistant Examiner* — Jerry Brooks
(74) *Attorney, Agent, or Firm* — Oliff PLC

(57) ABSTRACT

A projector includes a plurality of light sources, an integrator lens and an overlapping lens, a light guide optical system, a light control device, a light modulation device, and a projection optical system, the light control device includes a pair of light-blocking members opposed to each other across a light path of the light emitted from the light sources in one direction in which the plurality of partial areas is arranged on the integrator lens, and a control device adapted to move the light-blocking members into and out of the light path, and the control device moves the pair of light-blocking members into and out of the light path so that the light entering the overlapping lens has a shape with a symmetric property in accordance with lighting and extinction states of the plurality of light sources.

11 Claims, 16 Drawing Sheets

PROJECTOR AND ILLUMINATION DEVICE

BACKGROUND

1. Technical Field

The present invention relates to a projector and an illumination device.

2. Related Art

In the projector, there has been known a configuration in which a louver for controlling light is disposed to a light source to make the amount of the illumination light entering a light modulation device variable in accordance with a video signal (see, e.g., JP-A-2004-69966 and JP-A-2007-293274).

Incidentally, as a light source device for a projector, there is known a light source device, which has light respectively emitted from a plurality of light sources and arranged in a plane in an illumination area, and makes the light overlap each other to be equalized using an integrator optical system. In the case of applying the dimming device described above to such a multi-lamp light source device, a pair of retractable louvers is installed in a light path including light of a plurality of light source. In this case, in the case in which one or a plurality of the light sources is dead, a color ununiformity and an illuminance ununiformity occur in some cases when partially blocking the light in the light path with the louvers.

SUMMARY

An advantage of some aspects of the invention is to provide a projector and an illumination device each provided with a multi-lamp light source and a light control device, and having the color ununiformity and the illuminance ununiformity reduced in the dimming condition.

A projector according to an aspect of the invention includes a plurality of light sources, an integrator optical system including an integrator lens, and an overlapping lens adapted to overlap light emitted from the integrator lens, a light guide optical system adapted to guide light emitted from the respective light sources to partial areas of the integrator lens to thereby irradiate an entire area of the integrator lens, a light control device disposed on a light path of the light emitted from the light sources between the light sources and the overlapping lens, a light modulation device adapted to modulate the light emitted from the integrator optical system, and a projection optical system adapted to project the light modulated by the light modulation device, the light control device includes a pair of light-blocking members opposed to each other across the light path in one direction in which the plurality of partial areas is arranged on the integrator lens, and a control device adapted to move the light-blocking members into and out of the light path, and the control device moves the pair of light-blocking members into and out of the light path so that the light entering the overlapping lens has a shape with a symmetric property in accordance with lighting and extinction states of the plurality of light sources.

According to the configuration described above, the light as the light-blocking object input to the overlapping lens has a shape with a symmetric property in accordance with the lighting and extinction states of the plurality of light sources. Thus, in the illumination system for equalizing the light of the plurality of light sources using the integrator lens, even in the case in which some of the light sources are in the extinction state, the deviation of the light-blocking area can be reduced, and the illuminance ununiformity and the color ununiformity of the projection image can be inhibited from occurring.

The projector according to the aspect of the invention may be configured such that the control device moves the pair of light-blocking members into and out of the light path so that the pair of light-blocking members evenly block the light emitted from the light sources.

According to the configuration described above, the light as the light-blocking object emitted from the light sources can evenly be blocked by the pair of light-blocking members in accordance with the lighting and extinction states of the plurality of light sources. Thus, in the illumination system for equalizing the light of the plurality of light sources using the integrator lens, even in the case in which some of the light sources are in the extinction state, since the light are evenly blocked by the two light-blocking members, the deviation of the light-blocking area can be reduced, and the illuminance ununiformity and the color ununiformity of the projection image can be inhibited from occurring.

The projector according to the aspect of the invention may be configured such that each of the light-blocking members block at least a part of the light emitted from the partial area located at the furthest position from the light-blocking member itself in the one direction.

According to the configuration described above, it is possible for the plurality of light-blocking members to block the light not only in the partial area of the integrator lens on the near side to the light-blocking member itself, but also in a part of the partial area on the far side. Thus, in the illumination system for equalizing the light of the plurality of light sources using the integrator lens, even in the case in which some of the light sources are in the extinction state, it is possible to block the light emitted from the integrator lens in a horizontally symmetric manner or a vertically symmetric manner by the pair of light-blocking members. Therefore, the deviation of the light-blocking area can be reduced, and the illuminance ununiformity and the color ununiformity of the projection image can be inhibited from occurring.

The projector according to the aspect of the invention may be configured such that the light-blocking members each block a part of an outer edge portion of the light emitted from the light source.

According to the configuration described above, in the case of using the whole of the integrator lens, it is possible to make the light emitted from the integrator lens have a shape with a symmetric property.

The projector according to the aspect of the invention may be configured such that a number of the light sources is one of equal to and larger than four, a number of the partial areas arranged on the integrator lens in a row direction is one of equal to and larger than two, a number of the partial areas arranged on the integrator lens in a column direction is one of equal to and larger than two, and the light control device has a pair of the light-blocking members corresponding to the plurality of partial areas arranged in the row direction for each of the rows.

According to the configuration described above, even in the case in which either of the four or more light sources is in the extinction state, it is possible to block the light, which has been emitted from the light source in the lighting state, and is then emitted from the integrator lens, in a horizontally symmetric manner or a vertically symmetric manner. Thus, it is possible to suppress the illuminance ununiformity in an arbitrary lighting state.

The projector according to the aspect of the invention may be configured such that the control device includes a slide mechanism adapted to make a slide movement of the light-blocking member.

According to the configuration described above, it is possible to configure a light control device capable of evenly blocking the light without using a complicated mechanism.

The projector according to the aspect of the invention may be configured such that the light-blocking member has a first light-blocking plate connected to the slide mechanism, and a second light-blocking plate connected to the first light-blocking plate via one of a rotation mechanism and a slide mechanism.

According to the configuration described above, the second light-blocking plate can be disposed in the vicinity of the light as the light-blocking object by the movement of the first light-blocking plate, and further, by making the slide movement of the second light-blocking plate or rotating the second light-blocking plate at that position, the blocking level of the light can be controlled.

An illumination device according to an aspect of the invention includes a plurality of light sources, an integrator optical system including an integrator lens, and an overlapping lens adapted to overlap light emitted from the integrator lens, a light guide optical system adapted to guide light emitted from the respective light sources to partial areas of the integrator lens to thereby irradiate an entire area of the integrator lens, and a light control device disposed on a light path of the light emitted from the light sources between the light sources and the overlapping lens, the light control device includes a pair of light-blocking members opposed to each other across the light path in one direction in which the plurality of partial areas is arranged on the integrator lens, and a control device adapted to move the light-blocking members into and out of the light path, and the control device moves the pair of light-blocking members into and out of the light path so that the light entering the overlapping lens has a shape with a symmetric property in accordance with lighting and extinction states of the plurality of light sources.

According to the configuration described above, the light as the light-blocking object input to the overlapping lens has a shape with a symmetric property in accordance with the lighting and extinction states of the plurality of light sources. Thus, in the illumination system for equalizing the light beams of the plurality of light sources using the integrator lens, even in the case in which some of the light sources are in the extinction state, the deviation of the light-blocking area can be reduced, and the illuminance ununiformity of the illumination light can be suppressed.

The illumination device according to the aspect of the invention may be configured such that the control device moves the pair of light-blocking members into and out of the light path so that the pair of light-blocking members evenly block the light emitted from the light sources.

According to the configuration described above, the light as the light-blocking object emitted from the light sources can evenly be blocked by the pair of light-blocking members in accordance with the lighting and extinction states of the plurality of light sources. Thus, in the illumination system for equalizing the light of the plurality of light sources using the integrator lens, even in the case in which some of the light sources are in the extinction state, since the light are evenly blocked by the two light-blocking members, the deviation of the light-blocking area can be reduced, and the illuminance ununiformity of the illumination light can be suppressed.

The illumination device according to the aspect of the invention may be configured such that each of the light-blocking members block at least a part of the light emitted from the partial area located at the furthest position from the light-blocking member itself in the one direction.

According to the configuration described above, it is possible for the plurality of light-blocking members to block the light not only in the partial area of the integrator lens on the near side to the light-blocking member itself, but also in a part of the partial area on the far side. Thus, in the illumination system for equalizing the light of the plurality of light sources using the integrator lens, even in the case in which some of the light sources are in the extinction state, it is possible to block the light emitted from the integrator lens in a horizontally symmetric manner or a vertically symmetric manner by the pair of light-blocking members. Therefore, the deviation of the light-blocking area can be reduced, and the illuminance ununiformity of the illumination light can be suppressed.

The illumination device according to the aspect of the invention may be configured such that the light-blocking members each block a part of an outer edge portion of the light emitted from the light source.

According to the configuration described above, in the case of using the whole of the integrator lens, it is possible to make the light emitted from the integrator lens have a shape with a symmetric property.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
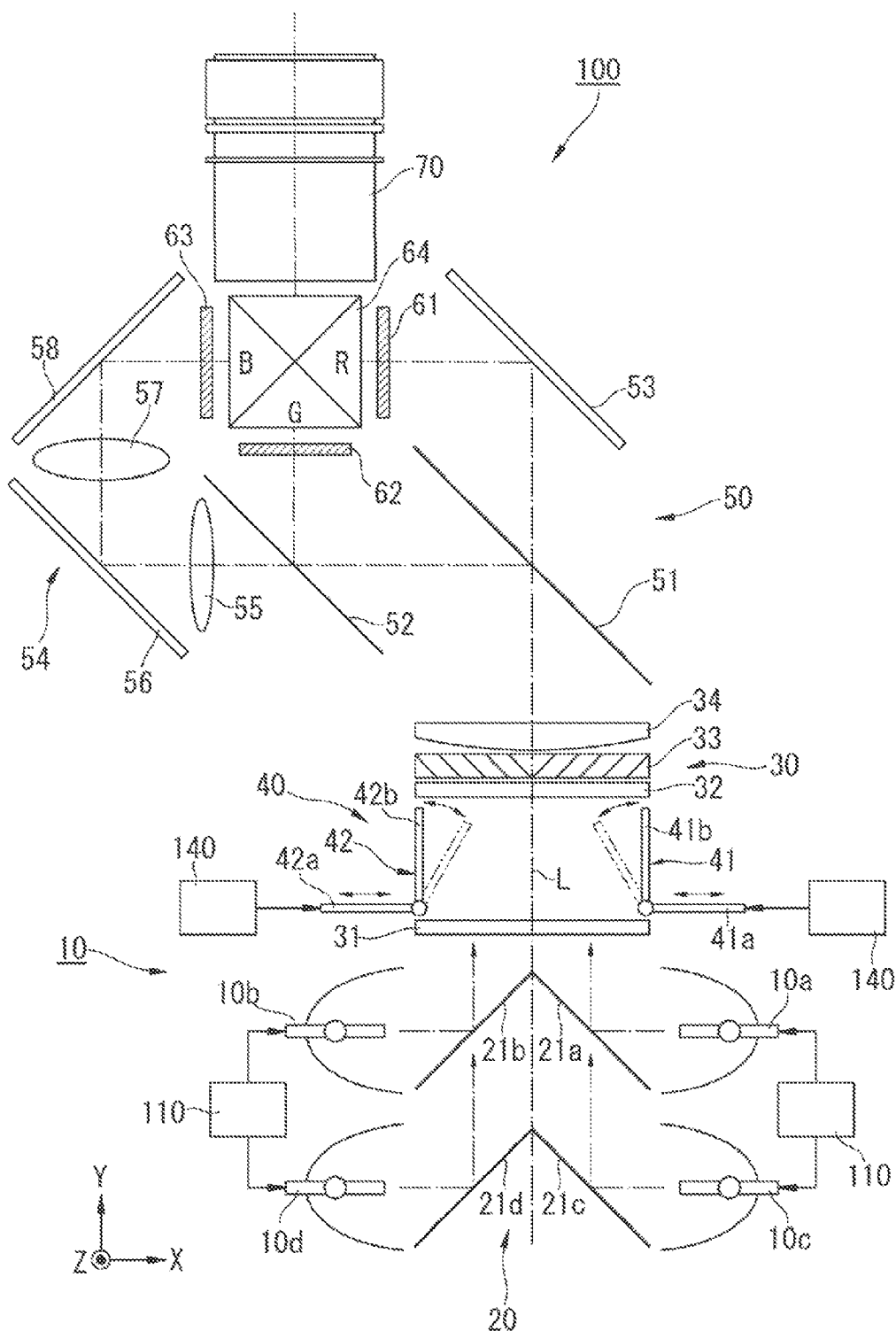
FIG. 1 is a schematic configuration diagram showing a projector according to a first embodiment of the invention.

Hereinafter, some embodiments of the invention are described with reference to the accompanying drawings.

It should be noted that the scope of the invention is not limited to the embodiments hereinafter described, but can arbitrarily be modified within the technical idea or the technical concept of the invention. Further, in the drawings explained hereinafter, in order to make each constituent easy to understand, the actual structures and the structures of the drawings are made different from each other in scale size, number, and so on.

First Embodiment

FIG. 1 is a schematic configuration diagram showing a projector according to a first embodiment of the invention. The projector 100 according to the present embodiment is a three-panel liquid crystal projector provided with transmissive liquid crystal light valves for respective colors different from each other, namely R (red), G (green), and B (blue).

The projector 100 includes four light sources 10a, 10b, 10c, and 10d, a light guide optical system 20, an integrator optical system 30, a dimming device 40 (a light control device 40), a color separation optical system 50, liquid crystal light valves (light modulation devices) 61, 62, and 63, a cross dichroic prism (a color combining optical system) 64, and a projection optical system 70. In the present embodiment, the light sources 10a through 10d, the light guide optical system 20, the integrator optical system 30, and the dimming device 40 constitute an illumination device 10.

The light sources 10a through 10d each have a lamp such as a super-high pressure mercury lamp, a metal halide lamp, or a xenon lamp, and a reflector for reflecting the light of the lamp. To the light sources 10a through 10d, there is connected a light source control device 110 for driving and controlling these light sources. The light guide optical system 20 includes four mirrors 21a through 21d. The integrator optical system 30 is an optical system for evenly irradiating the liquid crystal light valves 61 through 63 with each of the light from the respective light sources 10a through 10d, and includes a first integrator lens (an integrator lens) 31, a second integrator lens 32, a polarization conversion element 33, and an overlapping lens 34 sequentially arranged from the light guide optical system 20 side.

Figure 2A:
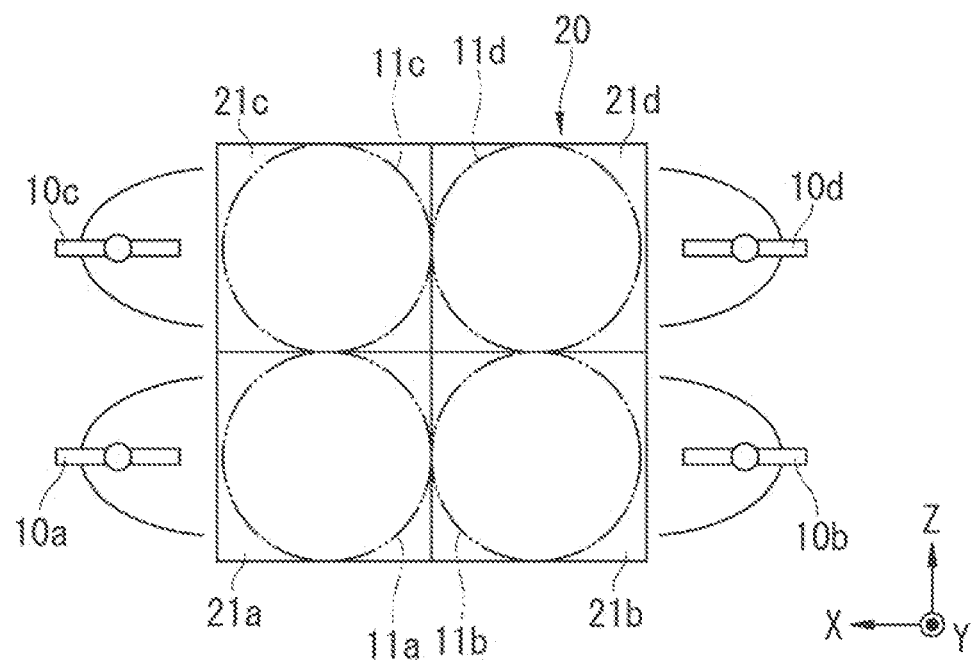
FIGS. 2A and 2B are explanatory diagrams of a configuration and an action of a light guide optical system.
Figure 2B:
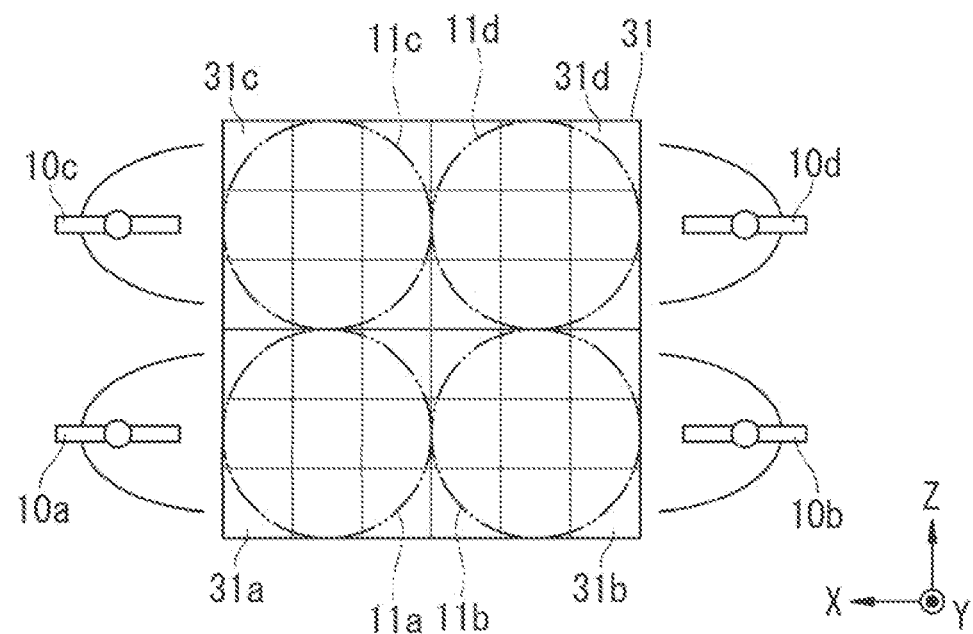

The light guide optical system 20 irradiates predetermined positions of the first integrator lens 31 respectively with light emitted from the light sources 10a through 10d. FIG. 2A is a diagram of the light guide optical system 20 viewed from the first integrator lens 31 side (in a −Y direction). FIG. 2B is an explanatory diagram of an action of the light guide optical system 20, and is a diagram of the first integrator lens 31 viewed from the second integrator lens 32 side (in the −Y direction).

As shown in FIGS. 1 and 2A, the light source 10a and the light source 10b are arranged so as to be opposed to each other in a light emitting direction (an X-axis direction in the drawing). A mirror 21a is disposed in front of the light source 10a, and a mirror 21b is disposed in front of the light source 10b. The mirrors 21a, 21b are disposed at an angle of 45° with the light emitting direction (the X-axis direction) described above so as to bend the light of the light sources 10a, 10b toward the first integrator lens 31.

The light source 10c and the light source 10d are also arranged to be opposed to each other in the light emitting direction. A mirror 21c is disposed in front of the light source 10c, and a mirror 21d is disposed in front of the light source 10d. The mirror 21c and the mirror 21d are disposed at an angle of 45° with the light emitting direction (the X-axis direction) described above so as to bend the light of the light sources 10c, 10d toward the first integrator lens 31.

In the present embodiment, as shown in FIG. 2A, the light sources 10a through 10d are arranged in two stages shifted vertically (in a Z-axis direction) from each other. In the upper stage (a +Z side), there are arranged the light sources 10c, 10d and the mirrors 21c, 21d, and in the lower stage (a −Z side), there are arranged the light sources 10a, 10b and the mirrors 21a, 21b. Further, in the case of the present embodiment, as shown in FIG. 1, the light sources 10a, 10b and the mirrors 21a, 21b arranged in the lower stage are disposed at positions nearer to the first integrator lens 31 than the light sources 10c, 10d and mirrors 21c, 21d arranged in the upper stage.

In the light guide optical system 20 provided with the configuration described above, as shown in FIG. 2B, light flux 11a, 11b, 11c and 11d emitted from the light sources 10a through 10d are respectively reflected by the corresponding mirrors 21a through 21d to be bent toward the first integrator lens 31. The light flux 11a through 11d respectively bent by the mirrors 21a through 21d enter respective partial areas of the first integrator lens 31 different from each other. Specifically, the light flux 11a through 11d respectively enter four partial areas 31a through 31d obtained by bisecting the first integrator lens 31 in vertical and horizontal directions (the Z-axis direction and the X-axis direction). In the present embodiment, these four light flux 11a through 11d illuminate the entire area of the first integrator lens 31.

In the case of the present embodiment, the first integrator lens 31 shown in FIG. 2B is a fly-eye lens having small lenses (lens elements) arranged in a 6×6 matrix in row and column directions. The partial areas 31a through 31d are each formed of a small lens group with small lenses arranged in a 3×3 matrix. Although in the present embodiment, the explanation is presented showing the first integrator lens 31 as a 6×6 small lens group in the drawings, in reality, the small lenses more than a 6×6 matrix are arranged. In the present embodiment, it is assumed that a light emitted from the small lens not shown and arranged in an outer edge portion of the first integrator lens 31 is blocked by a light-blocking member not shown.

The size of the first integrator lens 31, namely the number of small lenses arranged, is determined in accordance with the size of the light flux 11a through 11d respectively emitted from the light sources 10a through 10d.

The light flux respectively emitted from the lens elements of the first integrator lens 31 are overlapped with each other on the liquid crystal light valves 61 through 63 by the second integrator lens 32 and the overlapping lens 34.

It should be noted that it is also possible to adopt a configuration in which the second integrator lens 32 functions as the overlapping lens, and in such a case, the overlapping lens 34 can be eliminated. Further, in this case, the second integrator lens 32 corresponds to the overlapping lens in the appended claims.

The polarization conversion element 33 disposed between the second integrator lens 32 and the overlapping lens 34 is formed of, for example, a polarization beam splitter array (PBS array). The polarization conversion element 33 aligns the polarization directions of the light emitted from the second integrator lens 32, and then emits the light as a single linearly-polarized light. The polarization conversion element 33 has a structure of periodically arranging roughly rod-like prism elements in the width direction (the X-axis direction), each of which has a polarization split film, a reflecting film, and a wave plate.

The dimming device 40 is disposed on the light path between the light sources 10a through 10d and the overlapping lens 34. In more detail, the dimming device 40 is disposed between the first integrator lens 31 and the second integrator lens 32. The dimming device 40 is provided with a first light-blocking member 41 and a second light-blocking member 42. The first light-blocking member 41 includes a first light-blocking plate 41a, and a second light-blocking plate 41b connected to the first light-blocking plate 41a via a rotation mechanism described later. The second light-blocking member 42 includes a first light-blocking plate 42a, and a second light-blocking plate 42b connected to the first light-blocking plate 42a via a rotation mechanism. A dimming control device (a control device) 140 is connected to each of the first light-blocking member 41 and the second light-blocking member 42.

The dimming device 40 according to the present embodiment is a device for performing a dimming operation based on both of the lighting state of the light sources 10a through 10d, and image data of a display image.

The first light-blocking plates 41a, 42a are disposed so as to have the respective plate surfaces along a radial direction (the X-axis direction) of the light emitted from the first integrator lens 31. The second light-blocking plates 41b, 42b are rotatably connected to the inner (on an optical axis L side) tips of the first light-blocking plates 41a, 42a, respectively.

It should be noted that the optical axis L is the optical axis of the light with which the light guide optical system 20 irradiates the integrator optical system 30. In other words, the optical axis L is the optical axis of the light obtained by combining the light emitted from the respective light sources 10a through 10d and then reflected by the respective mirrors 21a through 21d toward the first integrator lens 31.

The dimming control device 140 is provided with a slide mechanism for moving the first light-blocking plate 41a of the first light-blocking member 41 and the first light-blocking plate 42a of the second light-blocking member 42 in a radial direction (the X-axis direction) of the light emitted from the first integrator lens 31. Further, the dimming control device 140 is provided with a rotation mechanism for rotating the second light-blocking plate 41b of the first light-blocking member 41 and the second light-blocking plate 42b of the second light-blocking member 42 around the axis (the Z axis) parallel to one of the sides of the first integrator lens 31. The first light-blocking member 41 and the second light-blocking member 42 can be driven independently of each other. In the first light-blocking member 41, the first light-blocking plate 41a and the second light-blocking plate 41b can be driven independently of each other. In the second light-blocking member 42, the first light-blocking plate 42a and the second light-blocking plate 42b can be driven independently of each other.

Figure 3A:
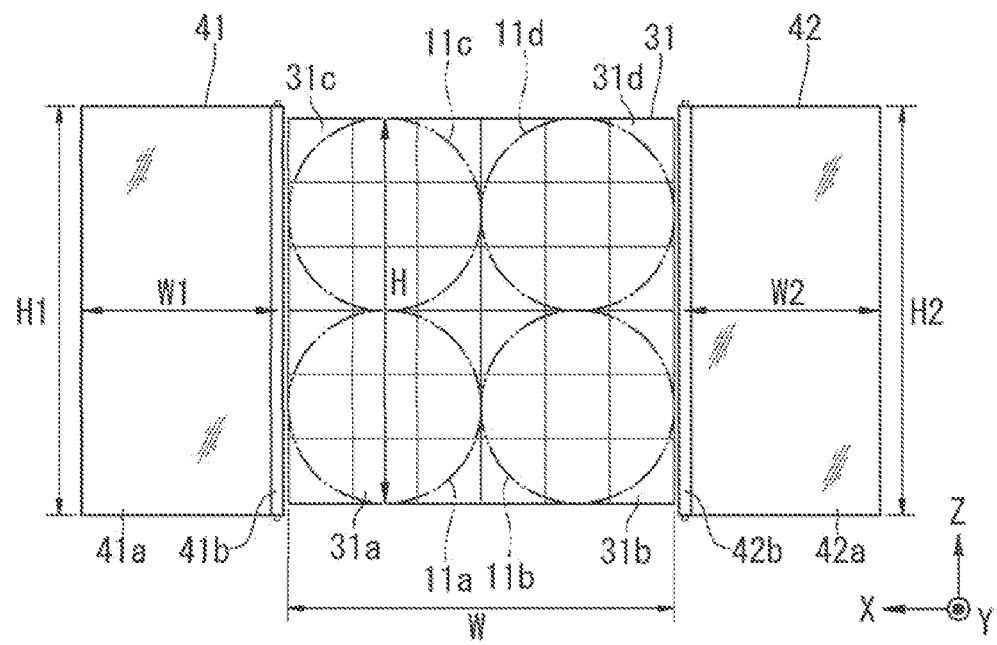
FIGS. 3A and 3B are explanatory diagrams of an operation of a dimming device.
Figure 3B:
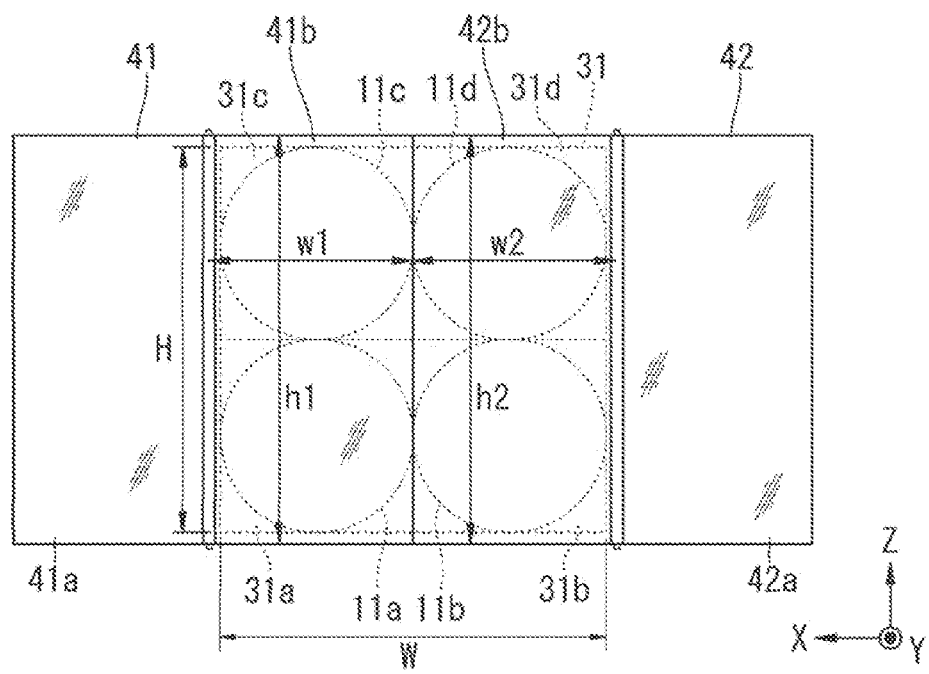

FIGS. 3A and 3B are diagrams of the dimming device 40 and the first integrator lens 31 viewed from the second integrator lens 32 side (in the −Y direction). FIG. 3A is a diagram showing a state (a fully open state) in which the second light-blocking plates 41b, 42b are opened, and FIG. 3B is a diagram showing a state (a fully closed state) in which the second light-blocking plates 41b, 42b are closed.

The first light-blocking member 41 and the second light-blocking member 42 are respectively disposed on both sides of the first integrator lens 31 across the optical axis L. Heights H1, H2 of the first light-blocking plates 41a, 42a are higher than a height H of the first integrator lens 31. Further, a width W1 of the first light-blocking plate 41a and a width W2 of the first light-blocking plate 42a are larger than a half (W/2) of the width W of the first integrator lens 31.

The first light-blocking member 41 and the second light-blocking member 42 can move back and forth from the outside toward the inside of the first integrator lens 31 along the width direction (the X-axis direction) of the first integrator lens 31. At the position of the first light-blocking member 41 shifted innermost, it is possible for the first light-blocking plate 41a to block the light in the two partial areas 31a, 31c of the first integrator lens 31. Further, at the position of the second light-blocking member 42 shifted innermost, it is possible for the first light-blocking plate 42a to block the light in the two partial areas 31b, 31d.

As shown in FIG. 3B, the second light-blocking plates 41b, 42b can be moved to the positions, at which the second light-blocking plates 41b, 42b are opposed to the first integrator lens 31, by rotating the second light-blocking plates 41b, 42b around respective axes parallel to the side along the height direction (the Z-axis direction) of the first integrator lens 31. Heights h1, h2 of the second light-blocking plates 41b, 42b are higher than the height H of the first integrator lens 31. Further, a width w1 of the second light-blocking plate 41b and a width w2 of the second light-blocking plate 42b are larger than a half (W/2) of the width W of the first integrator lens 31.

In the fully closed state shown in FIG. 3B, it is possible for the second light-blocking plate 41b to block the light in the two partial areas 31a, 31c of the first integrator lens 31. Further, it is possible for the second light-blocking plate 42b to block the light in the two partial areas 31b, 31d.

As described above, it is possible for the first light-blocking member 41 and the second light-blocking member 42 of the present embodiment to block the light in a part or the whole of the first integrator lens 31 by making a slide movement of the first light-blocking plates 41a, 42a, and further, to block the light in a part or the whole of the first integrator lens 31 also by rotating the second light-blocking plates 41b, 42b.

Going back to FIG. 1, the color separation optical system 50 is provided with a first dichroic mirror 51, a second dichroic mirror 52, a reflecting mirror 53, and a relay optical system 54. The relay optical system 54 includes a relay lens 55, a reflecting mirror 56, a relay lens 57, and a reflecting mirror 58. The color separation optical system 50 separates the illumination light emitted from the integrator optical system 30 into colored light of three colors of red (R), green (G), and blue (B), and at the same time guides the colored light to the liquid crystal light valves 61, 62, and 63, respectively, in the posterior stage.

The first dichroic mirror 51 transmits the R light and reflects the G light and the B light out of the light of the three colors of R, G, and B. Further, the second dichroic mirror 52 reflects the G light out of the G light and the B light, and transmits the B light.

The R light having been transmitted through the first dichroic mirror 51 enters the liquid crystal light valve 61 through the reflecting mirror 53. The G light having been reflected by the first dichroic mirror 51 and then having been reflected by the second dichroic mirror 52 enters the liquid crystal light valve 62. The B light having passed through the second dichroic mirror 52 enters the liquid crystal light valve 63 through the relay lens 55, the reflecting mirror 56, the relay lens 57, and the reflecting mirror 58.

The liquid crystal light valves 61, 62, and 63 modulate the spatial intensity distribution of the incident illumination light as a light modulation device. The polarization states of the three colored light having entered the liquid crystal panels of the liquid crystal light valves 61 through 63 are controlled pixel by pixel, respectively. The liquid crystal light valves 61 through 63 form modulated light, namely image light, of the corresponding colors, respectively.

It should be noted that the liquid crystal light valves 61 through 63 are each provided with the liquid crystal panel and a pair of polarization plates holding the both sides of the liquid crystal panel. Further, it is also possible to dispose a field lens on the light entrance side of each of the liquid crystal panels.

The cross dichroic prism 64 combines the image light of the respective colors emitted from the liquid crystal light valves 61, 62, and 63. The cross dichroic prism 64 is configured by bonding four rectangular prisms to each other. On the interfaces on which the rectangular prisms are bonded to each other, there are formed a first dielectric multilayer film and a second dielectric multilayer film intersecting with each other forming an X shape. The cross dichroic prism 64 reflects the R light from the liquid crystal, light valve 61 with the first dielectric multilayer film to thereby emit the R light toward the projection optical system 70, and reflects the B light from the liquid crystal light valve 63 with the second dielectric multilayer film to thereby emit the B light toward the projection optical system 70. The cross dichroic prism 64 transmits the G light from the liquid crystal light valve 62 to make the G light go straight and be emitted. In such a manner as described above, the cross dichroic prism 64 combines the R light, the G light, and the B light with each other to form the composite light as the image light corresponding to the color image.

The projection optical system 70 magnifies the image light formed of the composite light formed through the cross dichroic prism 64 at a desired magnification, and projects the color image on a screen (not shown).

Operation of Dimming Device

Then the operation of the dimming device in the projector 100 according to the present embodiment will be explained.

Figure 4:
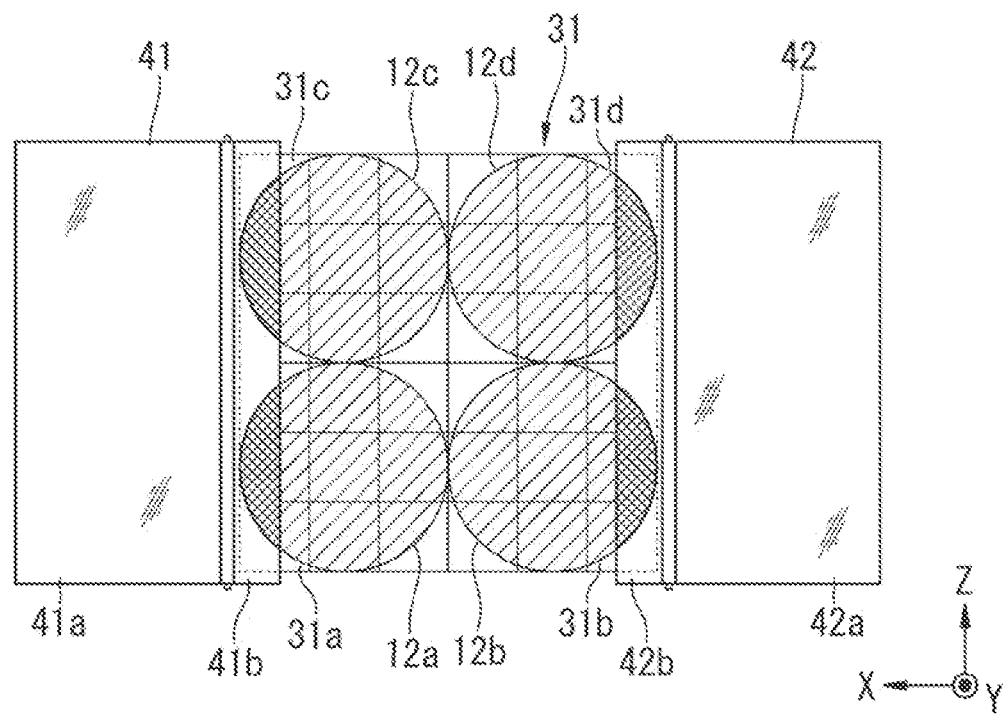
FIG. 4 is a diagram showing the dimming operation when lighting four lamps.
Figure 5A:
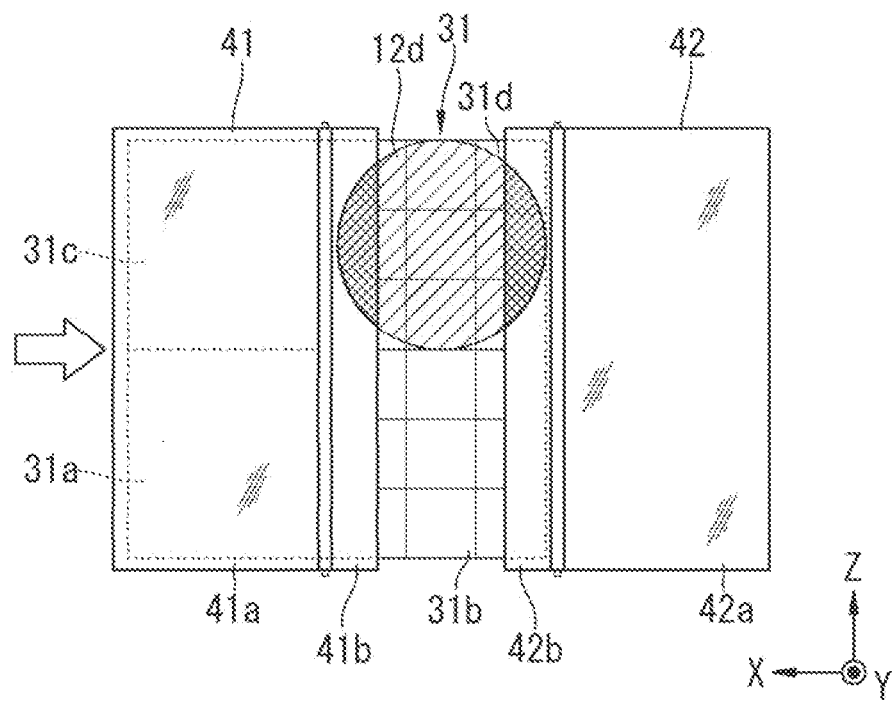
FIGS. 5A and 5B are diagrams showing the dimming operation when lighting one lamp.
Figure 5B:
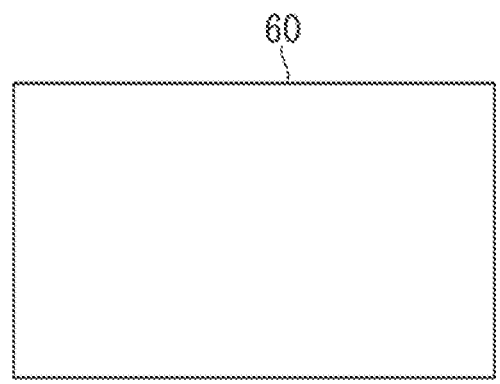
Figure 6A:
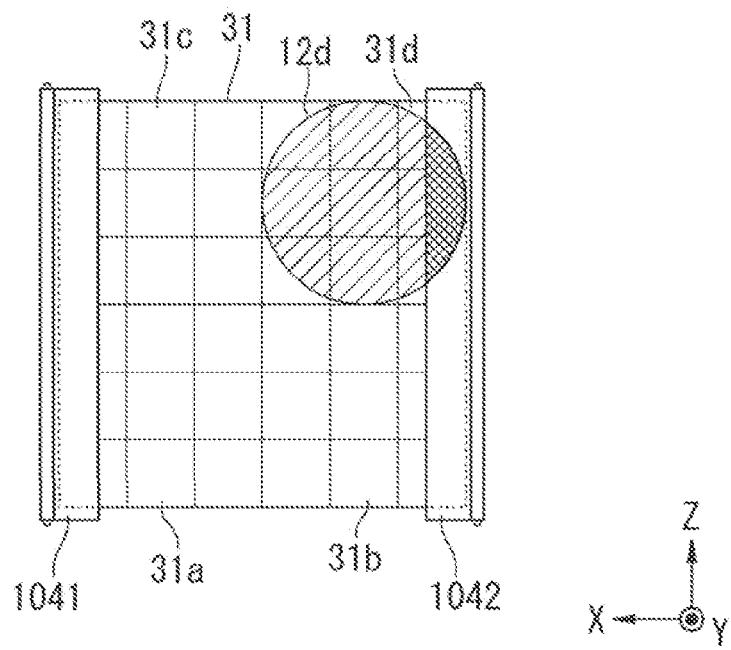
FIGS. 6A through 6C are explanatory diagrams of an operation of a dimming device according to the related art.
Figure 6B:
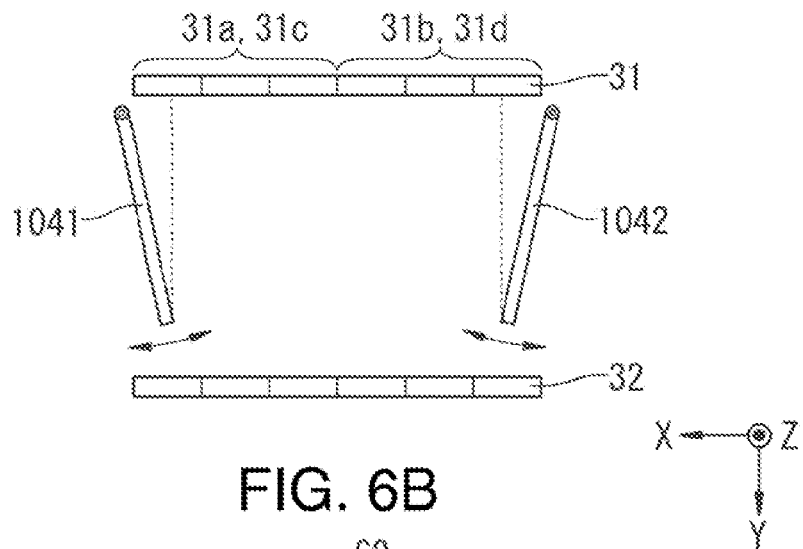
Figure 6C:
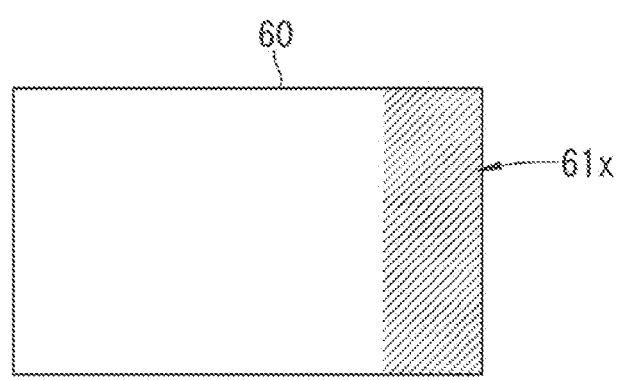

FIGS. 4, 5A, 5B, and 6A through 6C are explanatory diagrams of the operation of the dimming device. FIG. 4 is a diagram showing the dimming operation when lighting four lamps. FIG. 5A is a diagram showing the dimming operation when lighting one lamp, and FIG. 5B is a diagram showing an illuminance distribution in an image forming area of the liquid crystal light valve in the dimming state shown in FIG. 5A. FIGS. 6A and 6B are diagrams showing a dimming operation when lighting one lamp in a dimming device in the related art, and FIG. 6C is a diagram showing an illuminance distribution in an image forming area of a liquid crystal light valve in the dimming state shown in FIG. 6A.

Dimming Operation in Four-Lamp Lighting State

FIG. 4 schematically shows a state of light emission from the first integrator lens 31 in the four-lamp lighting state in which all of the light sources 10a through 10d are lighted. Emitted light flux 12a through 12d correspond respectively to the light flux 11a through 11d having entered the first integrator lens 31 and then transmitted through the first integrator lens 31.

It should be noted that although the emitted light flux 12a through 12d shown in FIG. 4 are each expressed by a circular shape similarly to the light flux 11a through 11d, the actual emitted light flux 12a through 12d are each formed of a plurality of light separated into by the lens elements of the first integrator lens 31 as the fly-eye lens. The same applies to the emitted light flux 12d shown in FIGS. 5A, 5B, and 6A through 6C.

In the projector 100 according to the present embodiment, the dimming control device 140 obtains the lighting states of the light sources 10a through 10d via the light source control device 110. Then, the dimming control device 140 controls the operation of the dimming device 40 based on information of the lighting states thus obtained. In the case of performing the dimming operation in the four-lamp lighting state shown in FIG. 4, the dimming control device 140 performs the following dimming operation based on detection information of the four-lamp lighting state.

In the four-lamp lighting state, the dimming control device 140 disposes the first light-blocking plate 41a of the first light-blocking member 41 and the first light-blocking plate 42a of the second light-blocking member 42 outside the first integrator lens 31. Specifically, the dimming control device 140 disposes the first light-blocking plates 41a, 42a outside the light path of the emitted light flux 12a through 12d proceeding from the first integrator lens 31 toward the second integrator lens 32.

Further, in the state in which the first light-blocking plates 41a, 42a are disposed in the outside as described above, the dimming control device 140 rotates the second light-blocking plate 41b of the first light-blocking member 41 and the second light-blocking plate 42b of the second light-blocking member 42 based on the image data of the display image to partially block the emitted light flux 12a through 12d to thereby control the illumination light intensity.

On this occasion, the dimming control device 140 makes the second light-blocking plates 41b, 42b act symmetrically to each other so as to have the rotational angles roughly equivalent to each other to thereby equally block the emitted light flux 12a through 12d. In other words, the dimming control device 140 makes the second light-blocking plates 41b, 42b act symmetrically to each other so as to have the rotational angles roughly equivalent to each other to thereby equally block the light emitted from the light sources 10a through 10d. In the example shown in FIG. 4, the rotational angles of the second light-blocking plates 41b, 42b are controlled so that the area where the light is blocked by the second light-blocking plate 41b and the area where the light is blocked by the second light-blocking plate 42b are located at positions line-symmetrical to each other about the center of the first integrator lens 31, and become equivalent in size to each other.

Due to such a dimming operation as described above, the asymmetric property of the emitted light flux 12a, 12c blocked only in the outer portions by the second light-blocking plate 41b and the asymmetric property of the emitted light flux 12b, 12d blocked only in the outer portions on the opposite side to those of the emitted light flux 12a, 12c are canceled out with each other. Specifically, the asymmetric property of the light emitted from the six lens elements located on the first light-blocking member 41 side of the partial areas 31a, 31c is canceled out with the asymmetric property of the light emitted from the six lens elements located on the second light-blocking member 42 side of the partial areas 31b, 31d.

Thus, the cross-sectional shape of the light emitted from the first integrator lens 31 becomes a symmetric shape, and the cross-sectional shape of the light flux entering the overlapping lens 34 via the second integrator lens 32 and the polarization conversion element 33 becomes a symmetric shape. As a result, in the case in which the light emitted from the respective lens elements included in the emitted light flux 12a through 12d having passed through the dimming device 40 are overlapped on the liquid crystal light valves 61 through 63 by the integrator optical system 30, it is possible to inhibit the illuminance ununiformity from occurring.

It should be noted that in the present specification, it is assumed that "symmetry" denotes line-symmetry with respect to the Z-axis direction and the X-axis direction, and "asymmetry" denotes asymmetry with respect to either one or both of the Z-axis direction and the X-axis direction.

Further, in particular, in the present specification, it is assumed that "the shape with which the light entering the overlapping lens has a symmetric property" denotes the shape with which the light intensity distribution becomes symmetric with respect to the line passing through the center of the emitted light flux and parallel to the vertical direction (the Z-axis direction) in the drawing, and the line passing through the center of the emitted light flux and parallel to the horizontal direction (the X-axis direction) in the drawing in the case in which the emitted light flux respectively emitted from the partial areas are overlapped with each other so that the centers of the respective emitted light flux coincide with each other.

Dimming Operation in One-Lamp Lighting State

FIG. 5A schematically shows a state of light emission from the first integrator lens 31 in the one-lamp lighting state in which the light source 10d are lighted alone out of the four light sources 10a through 10d. The one-lamp lighting state is the lighting state in the case in which, for example, the three light sources 10a, 10b, and 10c other than the light source 10d are in the extinction state due to the dead light sources, or the light sources ether than the light source 10d are put off for a power saving operation.

In the projector 100 according to the present embodiment, the dimming control device 140 obtains the lighting states of the light sources 10a through 10d via the light source control device 110. Then, the dimming control device 140 controls the operation of the dimming device 40 based on the information of the lighting states thus obtained. In the case of performing the dimming operation in the one-lamp lighting state shown in FIG. 5A, the dimming control device 140 performs the following dimming operation based on detection information of the one-lamp lighting state.

The dimming control device 140 firstly moves the first light-blocking plate 41a of the first light-blocking member 41 to the inside (toward the −X direction). In the case of the present embodiment, the dimming control device 140 moves the first light-blocking plate 41a to the position (if the light are emitted from the partial areas 31a, 31c, the position where almost all of the emitted light flux are blocked) where the partial area 31a and the partial area 31c of the first integrator lens 31 are covered. Meanwhile, the dimming control device 140 disposes the first light-blocking plate 42a of the second light-blocking member 42 outside the first integrator lens 31 similarly to the case of the four-lamp lighting state shown in FIG. 4.

Further, in the state in which the first light-blocking plates 41a, 42a are disposed in the outside as described above, the dimming control device 140 rotates the second light-blocking plate 41b of the first light-blocking member 41 and the second light-blocking plate 42b of the second light-blocking member 42 based on the image data of the display image to partially block the emitted light flux 12d to thereby control the illumination light intensity.

On this occasion, the dimming control device 140 makes the second light-blocking plates 41b, 42b act symmetrically to each other so as to have the rotational angles roughly equivalent to each other to thereby equally block the emitted light flux 12d. Specifically, the rotational angles of the second light-blocking plates 41b, 42b are controlled so that the area where the light is blocked by the second light-blocking plate 41b and the area where the light is blocked by the second light-blocking plate 42b are located at positions line-symmetrical to each other about the center of the partial area 31d, and become equivalent in size to each other in the emitted light flux 12d.

Due to such a dimming operation as described above, in the partial area 31d, the asymmetric property of the light emitted from the three lens elements partially blocked by the second light-blocking plate 41b and the asymmetric property of the light emitted from the three lens elements partially blocked by the second light-blocking plate 42b are canceled out with each other in the partial area 31d. Thus, it is possible to inhibit the illuminance ununiformity from occurring in the case in which the emitted light flux 12d having passed through the dimming device 40 is overlapped on the liquid crystal light valves 61 through 63 by the integrator optical system 30. As a result, as shown in FIG. 5B, an even illuminance distribution can be obtained in an image forming area 60 of each of the liquid crystal light valves.

It should be noted that although in the present embodiment described above, the one-lamp lighting state only with the light source 10d is explained, the illuminance ununiformity can be suppressed due to substantially the same dimming operation also in the case of the one-lamp lighting state with other light sources 10a, 10b, and 10c. Further, the illuminance ununiformity can be suppressed due to substantially the same dimming operation not only in the one-lamp lighting state, but also in a two-lamp lighting state with the light sources 10b, 10d, or a two-lamp lighting state with the light sources 10a, 10c.

Dimming Device of Related Art

Here, for the purpose of comparison, the illuminance ununiformity in the case of using a dimming device of the related art will be explained with reference to FIGS. 6A through 6C. FIG. 6A is a diagram obtained by replacing the first light-blocking member 41 and the second light-blocking member 42 shown in FIG. 5A with a first light-blocking member 1041 and a second light-blocking member 1042 of a rotary type known to the public.

The first light-blocking member 1041 and the second light-blocking member 1042 are each a plate-like light-blocking member rotatable around an axis parallel to one side of the first integrator lens 31. The first light-blocking member 1041 and the second light-blocking member 1042 rotate in sync with each other using a rotation mechanism such as an electric motor not shown. The first light-blocking member 1041 and the second light-blocking member 1042 can move into and out of an area between the first integrator lens 31 and the second integrator lens 32 due to the rotational action described above, and are capable of blocking the light emitted from the first integrator lens 31.

In the dimming device shown in FIGS. 6A and 6B, the rotational axes of the first light-blocking member 1041 and the second light-blocking member 1042 are fixed. Therefore, in the case in which the one-lamp lighting state occurs due to the blown light bulbs or the like, it results that the light intensity is controlled by blocking the emitted light 12d only with the second light-blocking member 1042 as shown in FIGS. 6A and 6B. Then, in the case shown in FIG. 6A, there occurs the state in which the light emitted from the three lens elements located on the second light-blocking member 1042 side are only partially blocked in the partial area 31d. Further, when the light are overlapped in the image forming areas of the liquid crystal light valves 61 through 63, a partial area 61x of the image forming area 60 becomes dark to cause the illuminance ununiformity as shown in FIG. 6C. Further, in the case in which the relay optical system 54 shown in FIG. 1 is an inverting optical system, since the illuminance ununiformity of the B light appears in the inverted position with respect to the R light and the G light, a color ununiformity is caused in the composite image.

In contrast to the dimming device of the related art described above, in the dimming device 40 according to the present embodiment described above, it is possible to make the slide movement of the first light-blocking plate 41a to thereby dispose the second light-blocking plate 41b in the vicinity of the emitted light flux 12d as the light-blocking object. Thus, it is possible to symmetrically block the emitted light flux 12d using the second light-blocking plates 41b, 42b to thereby make it possible to inhibit the illuminance ununiformity from occurring.

Second Embodiment

Figure 7A:
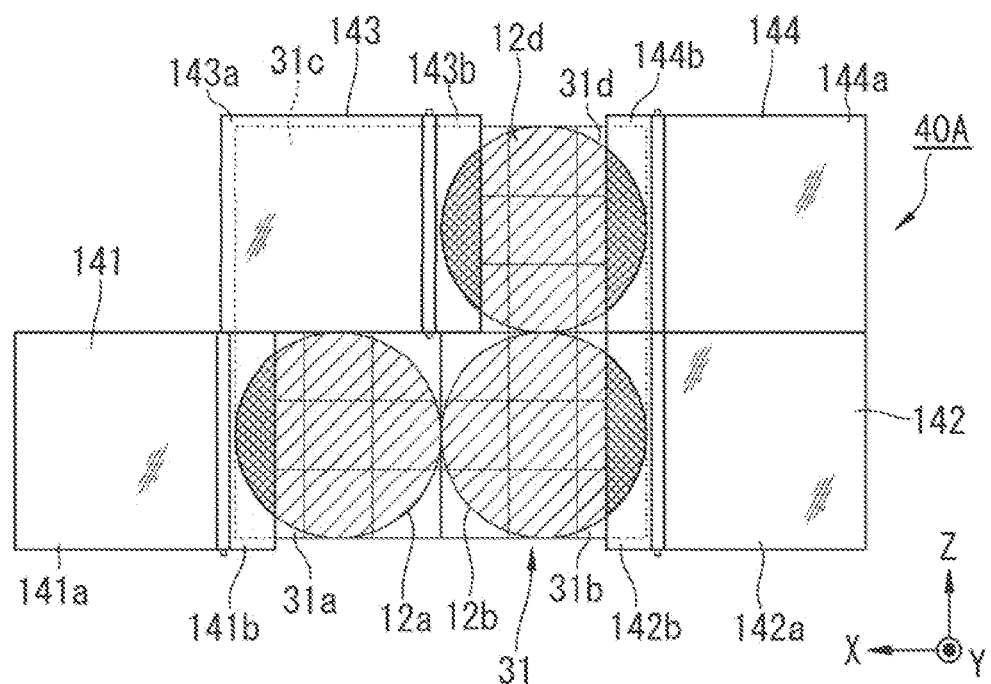
FIGS. 7A and 7B are diagrams showing an essential part of a projector according to a second embodiment of the invention.

FIG. 7A is a diagram showing an essential part of a projector according to a second embodiment of the invention.

The projector according to the second embodiment is provided with a dimming device 40A shown in FIG. 7A instead of the dimming device 40 shown in FIG. 1. As shown in FIG. 7A, the dimming device 40A is a device for controlling the illumination light intensity by partially or wholly blocking the light emitted from the first integrator lens 31.

Similarly to the light control device 40 according to the first embodiment, the light control device 40A according to the present embodiment is a device for performing a light control operation based on both of the lighting state of the light sources 10a through 10d, and image data of a display image.

Further, also in the present embodiment, it is assumed that a light emitted from the small lens not shown and arranged in an outer edge portion of the first integrator lens is blocked by a light-blocking member not shown in substantially the same manner as in the first embodiment.

The dimming device 40A is provided with a first light-blocking member 141, a second light-blocking member 142, a third light-blocking member 143, and a fourth light-blocking member 144. The first light-blocking member 141 includes a first light-blocking plate 141a and a second light-blocking plate 141b. The second light-blocking member 142 includes a first light-blocking plate 142a and a second light-blocking plate 142b. The third light-blocking member 143 includes a first light-blocking plate 143a and a second light-blocking plate 143b. The fourth light-blocking member 144 includes a first light-blocking plate 144a and a second light-blocking plate 144b. The first light-blocking member 141, the second light-blocking member 142, the third light-blocking member 143, and the fourth light-blocking member 144 are connected to the dimming control device 140 not shown, and perform the dimming operation under the control of the dimming control device 140.

The first light-blocking member 141 is disposed in the vicinity of the partial area 31a of the first integrator lens 31. The second light-blocking member 142 is disposed in the vicinity of the partial area 31b. The first light-blocking member 141 and the second light-blocking member 142 are paired light-blocking members, and are disposed at positions opposed to each other across the first integrator lens 31.

The third light-blocking member 143 is disposed above (on the +Z side of) the first light-blocking member 141, and in the vicinity of the partial area 31c of the first integrator lens 31. The fourth light-blocking member 144 is disposed in the vicinity of the partial area 31d. The third light-blocking member 143 and the fourth light-blocking member 144 are paired light-blocking members, and are disposed at positions opposed to each other across the first integrator lens 31.

The first light-blocking plates 141a, 142a, 143a, and 144a can make a slide movement in a radial direction (the X-axis direction) of the light emitted from the first integrator lens 31 similarly to the first light-blocking plates 41a, 42a according to the first embodiment. The first light-blocking plate 141a can block the light emitted from the partial area 31a of the first integrator lens 31 by making the slide movement. The first light-blocking plate 142a can block the light emitted from the partial area 31b by making the slide movement. The first light-blocking plate 143a can block the light emitted from the partial area 31c by making the slide movement. The first light-blocking plate 144a can block the light emitted from the partial area 31d by making the slide movement.

The second light-blocking plates 141b, 142b, 143b, and 144b are connected to inner tips (on the central side of the first integrator lens 31) of the corresponding first light-blocking plates 141a, 142a, 143a, and 144a via rotation mechanisms, respectively. Similarly to the second light-blocking plates 41b, 42b according to the first embodiment, the second light-blocking plates 141b, 142b, 143b, and 144b can rotate around rotary shafts provided to the connecting sections with the first light-blocking plates 141a, 142a, 143a, and 144a, respectively.

The second light-blocking plate 141b can block the light emitted from the partial area 31a or the partial area 31b in accordance with the position of the first light-blocking plate 141a by rotating. The second light-blocking plate 142b can block the light emitted from the partial area 31b or the partial area 31a in accordance with the position of the first light-blocking plate 142a. The second light-blocking plate 143b can block the light emitted from the partial area 31c or the partial area 31d in accordance with the position of the first light-blocking plate 143a. The second light-blocking plate 144b can block the light emitted from the partial area 31d or the partial area 31c in accordance with the position of the first light-blocking plate 144a.

According to the dimming device 40A related to the present embodiment provided with the configuration described above, it is possible to perform the dimming operation while suppressing the illuminance ununiformity even in the case in which the light sources 10a through 10d are in the three-lamp lighting state shown in FIG. 7A. In FIG. 7A, only the light sources 10a, 10b, and 10d are lighted, and the light source 10c is not lighted. On this occasion, the dimming control device 140 performs the following dimming operation based on the detection information of the three-lamp lighting state.

The dimming control device 140 makes the slide movement of the first light-blocking plate 143a of the third light-blocking member 143 corresponding to the partial area 31c (the area where the light of the light source 10c enters) toward the inside to thereby dispose the first light-blocking plate 143a in a position opposed to the partial area 31c. The first light-blocking member 141, the second light-blocking member 142, and the fourth light-blocking member 144 other than the third light-blocking member 143 are disposed so that the first light-blocking plates 141a, 142a, and 144a thereof are located outside the first integrator lens 31.

Then, in the arrangement state described above, the dimming control device 140 rotates the second light-blocking plates 141b, 142b, 143b, and 144b to partially or wholly block the emitted light flux 12a, 12b, and 12d. On this occasion, the dimming control device 140 makes the second light-blocking plates 141b, 142b act symmetrically to each other so as to have the rotational angles roughly equivalent to each other so that the paired second light-blocking plates 141b, 142b equally block the emitted light flux 12a, 12b. Thus, the asymmetric properties of the light emitted from the lens elements partially blocked by the second light-blocking plates 141b, 142b are canceled out with each other, and thus the illuminance ununiformity is inhibited from occurring.

Further, the dimming control device 140 makes the second light-blocking plates 143b, 144b act symmetrically to each other so as to have the rotational angles roughly equivalent to each other so that the paired second light-blocking plates 143b, 144b equally block the emitted light flux 12d. Thus, the asymmetric properties of the light emitted from the lens elements partially blocked by the second light-blocking plates 143b, 144b are canceled out with each other, and thus the illuminance ununiformity is further inhibited from occurring.

Figure 7B:
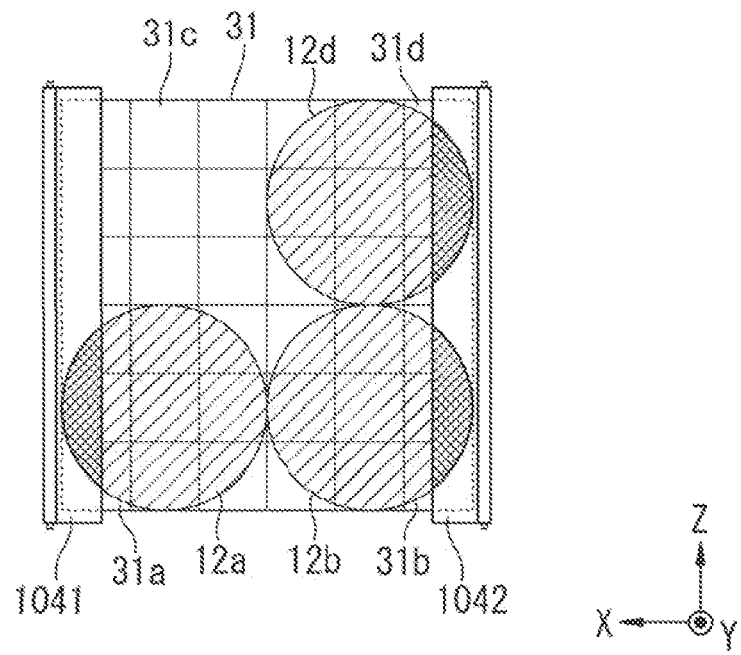

It should be noted that as shown in FIG. 7B, in the case of using the dimming device (the first light-blocking member 1041, the second light-blocking member 1042) of the related art, in the three-lamp lighting state with the light sources 10a, 10b, and 10d, the first light-blocking member 1041 and the second light-blocking member 1042 only partially block each of the emitted light flux 12a, 12b, and 12d.

Although in the second embodiment described above, the three-lamp lighting state is explained, the dimming process can effectively be performed in, for example, the two-lamp lighting state in which only the light source 10a and the light source 10d are lighted and the two-lamp lighting state in which only the light source 10b and the light source 10c are lighted (each of these states are hereinafter referred to also as a diagonal two-lamp lighting state). This is because the dimming device 40A according to the present embodiment can symmetrically block the light as the light-blocking object in each of the stages, namely the partial areas 31a, 31b in the lower stage of the first integrator lens 31, and the partial areas 31c, 31d in the upper stage.

First Modified Example of Dimming Device

Figure 8A:
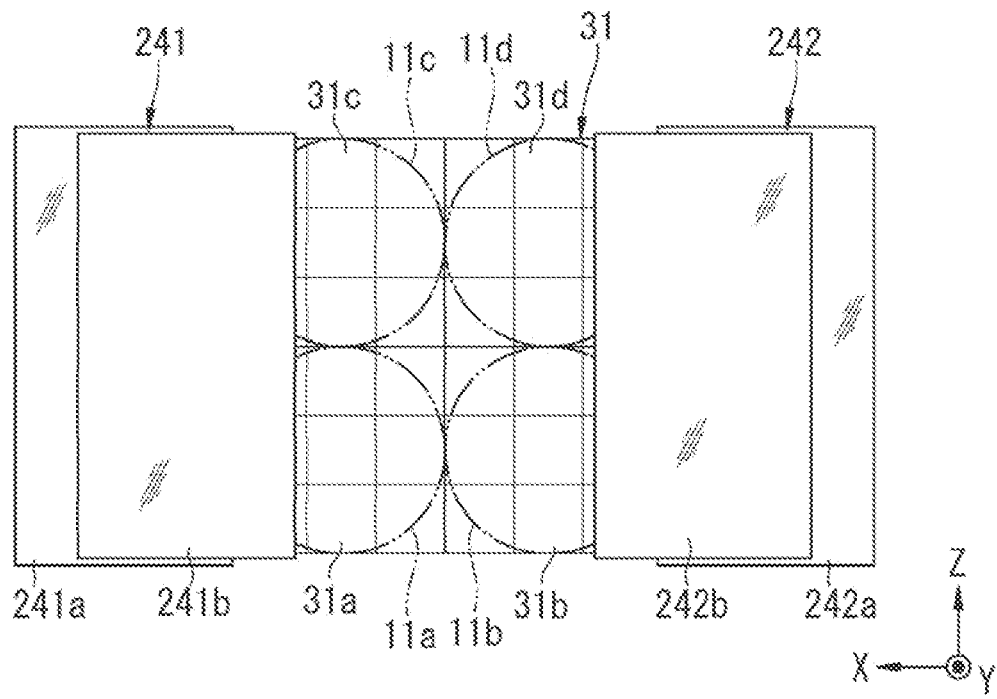
FIGS. 8A and 8B are diagrams showing a first modified example of a dimming device.
Figure 8B:
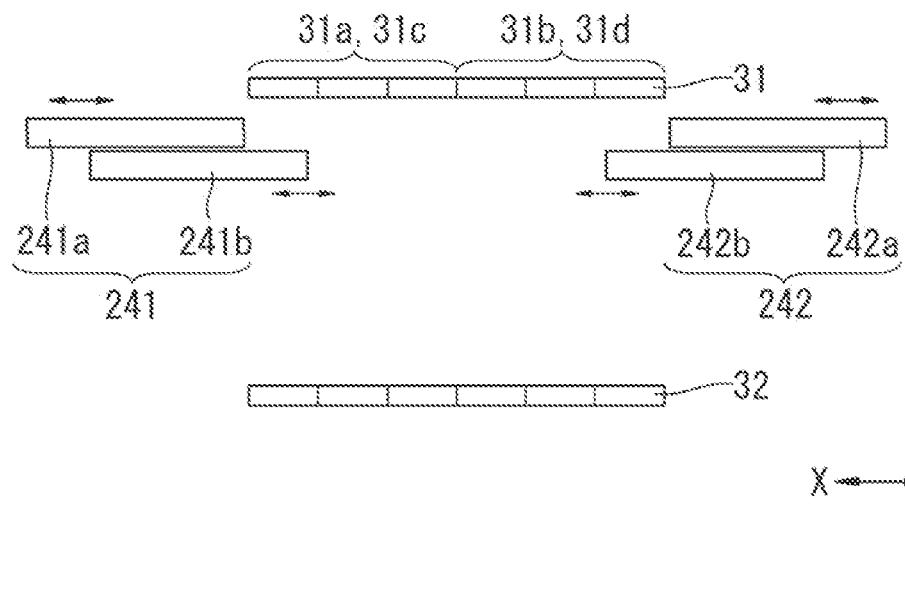

FIGS. 8A and 8B are diagrams showing a first modified example of the dimming device. FIG. 8A is a diagram of the dimming device according to the first modified example viewed from the second integrator lens 32 side, and FIG. 8B is a diagram thereof viewed downward (the −Z direction) from above.

As shown in FIGS. 8A and 8B, the dimming device according to the first modified example is provided with a first light-blocking member 241 and a second light-blocking member 242. The first light-blocking member 241 includes a first light-blocking plate 241a, and a second light-blocking plate 241b slidably connected to the first light-blocking plate 241a. The second light-blocking member 242 includes a first light-blocking plate 242a, and a second light-blocking plate 242b slidably connected to the first light-blocking plate 242a. The first light-blocking member 241 and the second light-blocking member 242 are connected to the dimming control device 140 not shown, and perform the dimming operation under the control of the dimming control device 140.

The first light-blocking plates 241a, 242a can make a slide movement in a radial direction (the X-axis direction) of the light emitted from the first integrator lens 31 similarly to the first light-blocking plates 41a, 42a according to the first embodiment. The first light-blocking plate 241a can block the light emitted from the partial areas 31a, 31c of the first integrator lens 31 by making the slide movement. The first light-blocking plate 242a can block the light emitted from the partial areas 31b, 31d by making the slide movement.

The second light-blocking plates 241b, 242b each can make a slide movement from the inside (on the central side of the first integrator lens 31) of corresponding one of the first light-blocking plates 241a, 242a toward the tip thereof.

The second light-blocking plate 241b can block the light emitted from the partial area 31a (31c) or the partial area 31b (31d) in accordance with the position of the first light-blocking plate 241a by making the slide action with respect to the first light-blocking plate 241a. The second light-blocking plate 242b can block the light emitted from the partial area 31b (31d) or the partial area 31a (31c) in accordance with the position of the first light-blocking plate 242a.

According to the dimming device related to the first modified example provided with the configuration described above, substantially the same operation as the operation of the first embodiment can be achieved, and it is possible to perform the dimming operation while suppressing the illuminance ununiformity in the one-lamp lighting state or the two-lamp lighting state.

Second Modified Example of Dimming Device

Figure 9A:
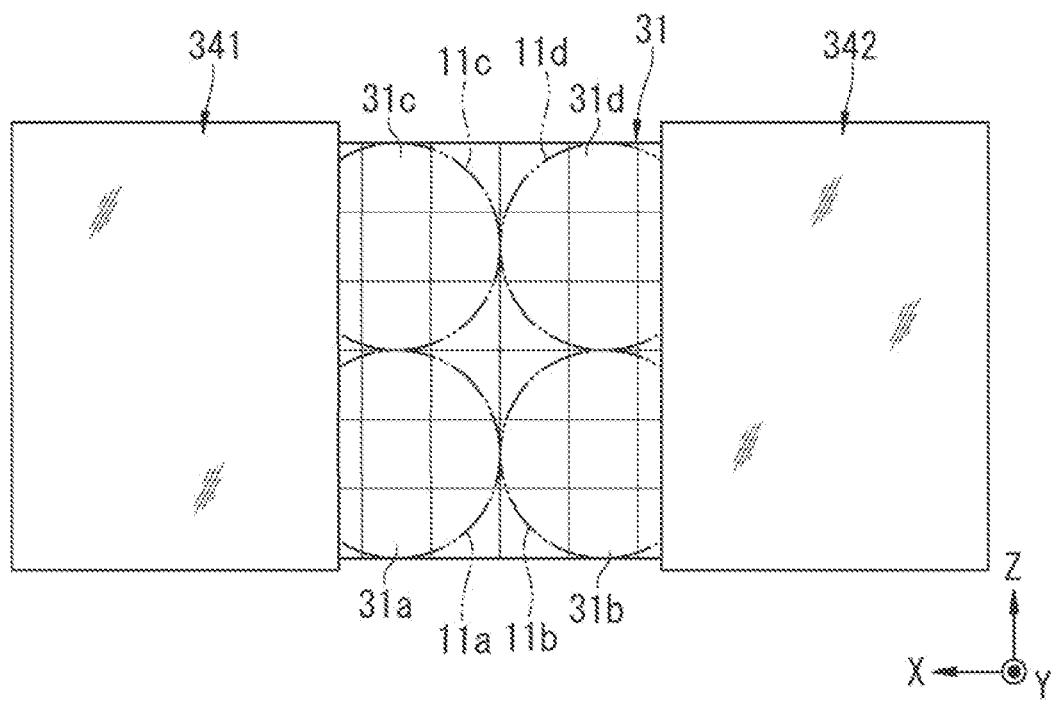
FIGS. 9A and 9B are diagrams showing a second modified example of a dimming device.
Figure 9B:
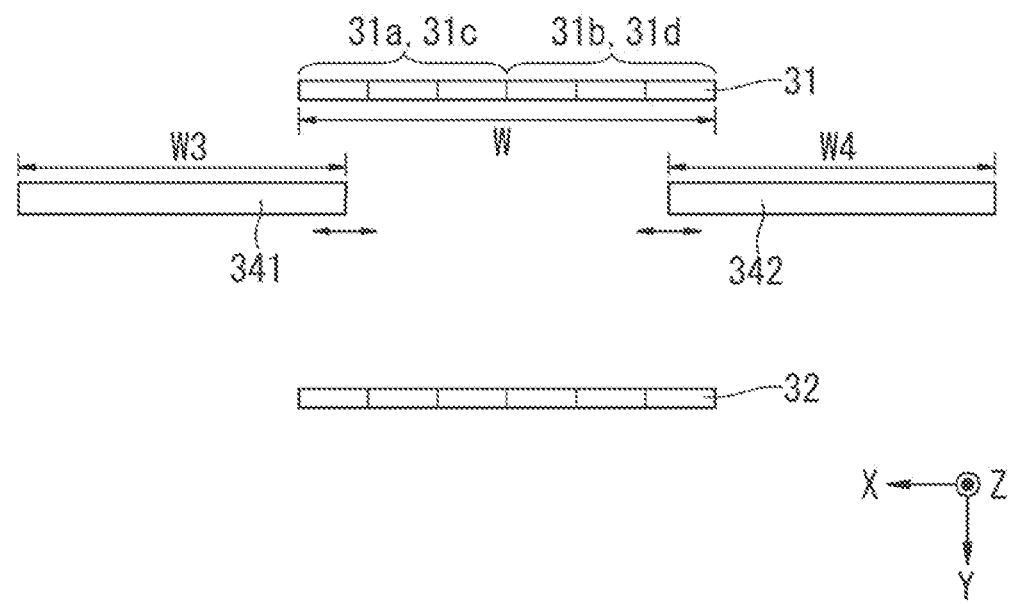

FIGS. 9A and 9B are diagrams showing a second modified example of the dimming device. FIG. 9A is a diagram of the dimming device according to the second modified example viewed from the second integrator lens 32 side, and FIG. 9B is a diagram thereof viewed downward (the −Z direction) from above.

As shown in FIGS. 9A and 9B, the dimming device according to the second modified example includes a first light-blocking member 341 and a second light-blocking member 342.

Although in each of the embodiments described above, it is assumed that there is adopted the configuration in which the pair of light-blocking members are each provided with the first light-blocking plate and the second light-blocking plate, in the second modified example shown in FIGS. 9A and 9B, the first light-blocking member 341 and the second light-blocking member 342 are each formed of a single light-blocking plate.

The first light-blocking member 341 and the second light-blocking member 342 can make a slide movement in a radial direction (the X-axis direction) of the light emitted from the first integrator lens 31 similarly to the first light-blocking plates 41a, 42a according to the first embodiment. Further, in the second modified example, a width W3 of the first light-blocking member 341 and a width W4 of the second light-blocking member 342 each have a length equal to or larger than ¾ of the width W (the length in the X-axis direction) of the first integrator lens 31.

The first light-blocking member 341 can partially or wholly block the light emitted from the partial areas 31a, 31c of the first integrator lens 31 by making the slide movement, and can block a half of each of the light emitted from the partial areas 31b, 31d in addition thereto.

The second light-blocking member 342 can partially or wholly block the light emitted from the partial areas 31b, 31d by making the slide movement, and can block a half of each of the light emitted from the partial areas 31a, 31c in addition thereto.

According to the dimming device related to the second modified example provided with the configuration described above, substantially the same operation as the operation of the first embodiment can be achieved, and it is possible to perform the dimming operation while suppressing the illuminance ununiformity in the one-lamp lighting state or the two-lamp lighting state.

It should be noted that the first light-blocking member 241 and the second light-blocking member 242 according to the first modified example and the first light-blocking member 341 and the second light-blocking member 342 according to the second modified example described above can also be applied to the second embodiment explained above. By applying these light-blocking members to the second embodiment, the light control operation can be performed while suppressing the illuminance ununiformity also in the three-lamp lighting state and the diagonal two-lamp lighting state.

Third Embodiment

Figure 10A:
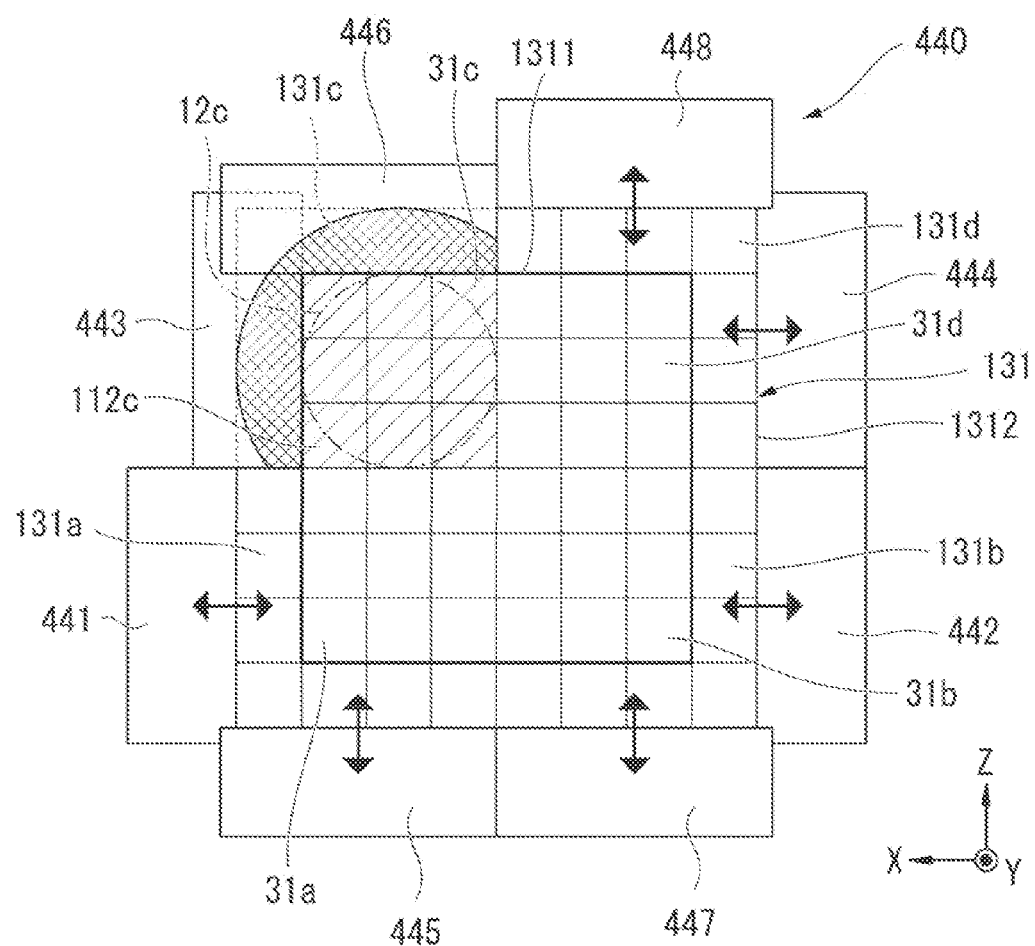
FIGS. 10A and 10B are diagrams showing an essential part of a projector according to a third embodiment of the invention.
Figure 10B:
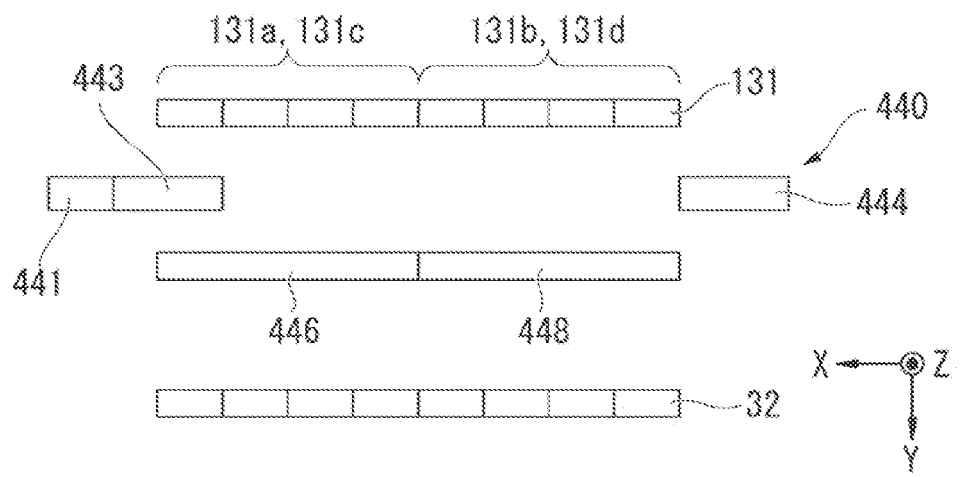

FIGS. 10A and 10B are diagrams showing an essential part of a projector according to a third embodiment of the invention.

The projector according to the third embodiment is provided with a dimming device 440 shown in FIGS. 10A and 10B instead of the dimming device 40 shown in FIG. 1. As shown in FIG. 10A, the dimming device 440 is a device for partially or wholly blocking the light emitted from a first integrator lens 131.

Unlike the dimming device 40 according to the first embodiment, the dimming device 440 according to the present embodiment is a device for performing a dimming operation based only on the lighting state of the light sources 10a through 10d.

Further, unlike the first embodiment and the second embodiment, in the present embodiment, there is explained the case in which the light are emitted from the first integrator lens 131 including the small lenses (the lens elements) arranged outside (in the outer edge portion of) the first integrator lens 31 of the embodiments described above.

Firstly, the first integrator lens 131 will be explained.

Figure 11:
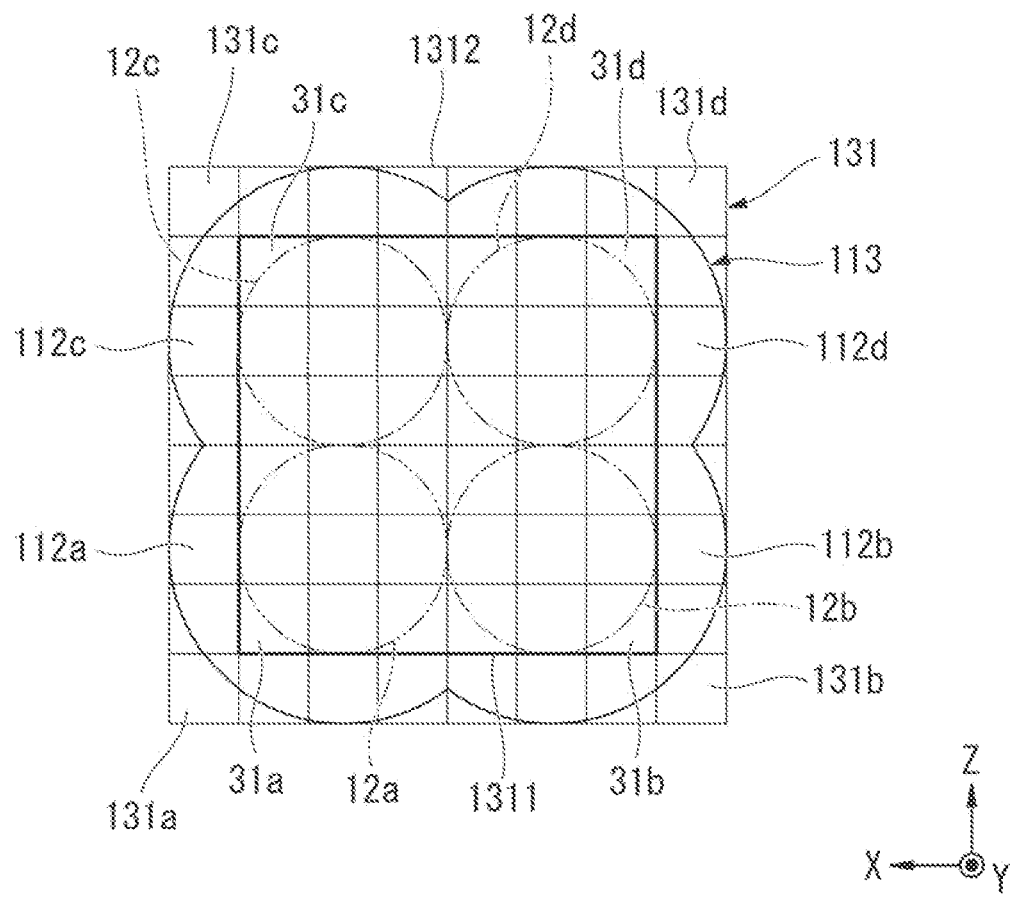
FIG. 11 is a diagram showing the state of lighting four lamps in the case of using the whole of a first integrator lens.

FIG. 11 is a diagram of the first integrator lens 131 in the state in which the light-blocking is not provided to the outside, viewed from the second integrator lens 32 side (in the −Y direction). FIG. 11 shows the four-lamp lighting state.

As shown in FIG. 11, the first integrator lens 131 is a fly-eye lens having the small lenses arranged in an 8×8 matrix. The first integrator lens 131 is divided in the row direction and the column direction into partial areas 131a through 131d each formed of a 4×4 lens array. In other words, the first integrator lens 131 has a configuration in which an outer edge portion 1312 having 28 small lenses arranged to form a rectangular ring-like shape is disposed in the outer periphery of a lens central portion 1311 formed of a 6×6 matrix. Therefore, the lens central portion 1311 is an area corresponding to the first integrator lens 31 in the embodiments described above.

The partial areas 131a through 131d of the first integrator lens 131 are each formed of corresponding one of the partial areas 31a through 31d of the lens central portion 1311 (the first integrator lens 31 of the embodiments described above) and a part of the outer edge portion 1312.

In other words, the partial area 131a is formed of the partial area 31a and an L-shaped portion (a small lens group) located in the outer periphery of the partial area 31a out of the outer edge portion 1312.

The partial area 131b is formed of the partial area 31b and an L-shaped portion (a small lens group) located in the outer periphery of the partial area 31b out of the outer edge portion 1312.

The partial area 131c is formed of the partial area 31c and an L-shaped portion (a small lens group) located in the outer periphery of the partial area 31c out of the outer edge portion 1312.

The partial area 131d is formed of the partial area 31d and an L-shaped portion (a small lens group) located in the outer periphery of the partial area 31d out of the outer edge portion 1312.

In the case in which the light emitted from the integrator lens 131 are not blocked, the light dispersed outside the emitted light flux 12a through 12d emitted from the first integrator lens 31 of the embodiments described above can also be used as the light flux. In other words, in the present embodiment, the emitted light flux emitted from the first integrator lens 131 become emitted light flux 112a through 112d each including the light dispersed outside, and the first integrator lens 131 emits an emitted light flux 113 as a whole. The cross-sectional shape of the emitted light flux 113 is a cloverleaf shape having four circles combined with each other so as to be partially overlapped with each other.

In this case, since the light dispersed outside the emitted light flux 12a through 12d of the embodiments described above can also be used, the efficiency of the light can be enhanced, and at the same time, the luminance of the projection image to be projected on a screen (not shown) can be enhanced.

Then, the dimming device 440 will now be explained.

The dimming device 440 according to the present embodiment is for performing a dimming operation so that the light emitted from the whole of the first integrator lens 131 formed of the 8×8 matrix enters the second integrator lens 32 in the fully open state, and only the light emitted from the lens central portion 1311 formed of the 6×6 matrix enters the second integrator lens 32 in the fully closed state. In other words, the dimming device 440 performs a dimming operation of the light emitted from the outer edge portion 1312 of the first integrator lens 131.

The dimming device 440 is provided with a first light-blocking member 441, a second light-blocking member 442, a third light-blocking member 443, a fourth light-blocking member 444, a fifth light-blocking member 445, a sixth light-blocking member 446, a seventh light-blocking member 447, and an eighth light-blocking member 448. The first light-blocking member 441 through the eighth light-blocking member 448 are connected to the dimming control device 140 not shown, and performs a dimming operation of the light emitted from the first integrator lens 131 under the control of the control device 140.

The first light-blocking member 441 through the eighth light-blocking member 448 are each a rectangular plate-like member, and are disposed along the respective external sides of the first integrator lens 131 so that the longitudinal direction is parallel to the corresponding external side. The width of each of the first light-blocking member 441 through the eighth light-blocking member 448 is larger than the external dimension of the small lens included in the outer edge portion 1312 of the first integrator lens 131.

The first light-blocking member 441 is disposed in the vicinity of the partial area 131a of the first integrator lens 131 on the side (the +X side) opposite to the side where the partial area 131b is disposed. The second light-blocking member 442 is disposed in the vicinity of the partial area 131b on the side (the −X side) opposite to the side where the partial area 131a is disposed. The first light-blocking member 441 and the second light-blocking member 442 are disposed at positions opposed to each other across the first integrator lens 131 in the lateral direction (the X-axis direction) in the drawing.

The third light-blocking member 443 is disposed above (on the +Z side of) the first light-blocking member 441, and in the vicinity of the partial area 131c of the first integrator lens 131 on the side (the +X side) opposite to the side where the partial area 131d is disposed. The fourth light-blocking member 444 is disposed above (on the +Z side of) the second light-blocking member 442, and in the vicinity of the partial area 131d on the side (the −X side) opposite to the side where the partial area 131c is disposed. The third light-blocking member 443 and the fourth light-blocking member 444 are disposed at positions opposed to each other across the first integrator lens 131 in the lateral direction (the X-axis direction) in the drawing.

The fifth light-blocking member 445 is disposed in the vicinity of the partial area 131a of the first integrator lens 131 on the side (the −Z side) opposite to the side where the partial area 131c is disposed. The sixth light-blocking member 446 is disposed in the vicinity of the partial area 131c on the side (the +Z side) opposite to the side where the partial area 131a is disposed. The fifth light-blocking member 445 and the sixth light-blocking member 446 are disposed at positions opposed to each other across the first integrator lens 1311 in the vertical direction (the Z-axis direction) in the drawing.

The seventh light-blocking member 447 is disposed on the right side (the −X side) of the fifth light-blocking member 445, and in the vicinity of the partial area 131b of the first integrator lens 131 on the side (the −Z side) opposite to the side where the partial area 131d is disposed. The eighth light-blocking member 448 is disposed on the right side (the −X side) of the sixth light-blocking member 446, and in the vicinity of the partial area 131d on the side (the +Z side) opposite to the side where the partial area 113b is disposed. The seventh light-blocking member 447 and the eighth light-blocking member 448 are disposed at positions opposed to each other across the first integrator lens 131 in the vertical direction (the Z-axis direction) in the drawing.

The first light-blocking member 441 and the fifth light-blocking member 445 are paired light-blocking members, and are both the members for blocking the light emitted from the partial area 131a.

The second light-blocking member 442 and the seventh light-blocking member 447 are paired light-blocking members, and are both the members for blocking the light emitted from the partial area 131b.

The third light-blocking member 443 and the sixth light-blocking member 446 are paired light-blocking members, and are both the members for blocking the light emitted from the partial area 131c.

The fourth light-blocking member 444 and the eighth light-blocking member 448 are paired light-blocking members, and are both the members for blocking the light emitted from the partial area 131d.

The first light-blocking member 441 through the fourth light-blocking member 444 can make a slide movement in a radial direction (the X-axis direction) of the light emitted from the first integrator lens 131. The first light-blocking member 441 can block a part of the outer edge portion on the left side (the +X side) of the light emitted from the partial area 131a of the first integrator lens 131 by making the slide movement. In more detail, the first light-blocking member 441 can block the light emitted from the four small lenses in the outer edge portion 1312 arranged in the left side (the +X side) end portion of the partial area 131a.

The second light-blocking member 442 can block the outer edge portion on the right side (the −X side) of the light emitted from the partial area 131b of the first integrator lens 131 by making the slide movement. In more detail, the second light-blocking member 442 can block the light emitted from the four small lenses in the outer edge portion 1312 arranged in the right side (the −X side) end portion of the partial area 131b.

The third light-blocking member 443 can block the outer edge portion on the left side (the +X side) of the light emitted from the partial area 131c of the first integrator lens 131 by making the slide movement. In more detail, the third light-blocking member 443 can block the light emitted from the four small lenses in the outer edge portion 1312 arranged in the left side (the +X side) end portion of the partial area 131c.

The fourth light-blocking member 444 can block the outer edge portion on the right side (the −X side) of the light emitted from the partial area 131d of the first integrator lens 131 by making the slide movement. In more detail, the fourth light-blocking member 444 can block the light emitted from the four small lenses in the outer edge portion 1312 arranged in the right side (the −X side) end portion of the partial area 131d.

The fifth light-blocking member 445 through the eighth light-blocking member 448 can make a slide movement in a radial direction of the light emitted from the first integrator lens 131, and in the direction (the Z-axis direction) perpendicular to the direction in which the first light-blocking member 441 through the fourth light-blocking member 444 can make the slide movement. The fifth light-blocking member 445 can block a part of the outer edge portion on the lower side (the −Z side) of the light emitted from the partial area 131a of the first integrator lens 131 by making the slide movement. In more detail, the fifth light-blocking member 445 can block the light emitted from the four small lenses in the outer edge portion 1312 arranged in the lower side (the −Z side) end portion of the partial area 131a.

The sixth light-blocking member 446 can block the outer edge portion on the upper side (the +Z side) of the light emitted from the partial area 131c of the first integrator lens 131 by making the slide movement. In more detail, the sixth light-blocking member 446 can block the light emitted from the four small lenses in the outer edge portion 1312 arranged in the upper side (the +Z side) end portion of the partial area 131c.

The seventh light-blocking member 447 can block the outer edge portion on the lower side (the −Z side) of the light emitted from the partial area 131b of the first integrator lens 131 by making the slide movement. In more detail, the seventh light-blocking member 447 can block the light emitted from the four small lenses in the outer edge portion 1312 arranged in the lower side (the −Z side) end portion of the partial area 131b.

The eighth light-blocking member 448 can block the outer edge portion on the upper side (the +Z side) of the light emitted from the partial area 131d of the first integrator lens 131 by making the slide movement. In more detail, the eighth light-blocking member 448 can block the light emitted from the four small lenses in the outer edge portion 1312 arranged in the upper side (the +Z side) end portion of the partial area 131d.

As in the example shown in FIG. 10A, by the third light-blocking member 443 and the sixth light-blocking member 446 blocking the light emitted from a part of the outer edge portion 1312 included in the partial area 131c, it results that only the light emitted from the partial area 31c in the partial area 131c passes through the dimming device 440 and then enters the second integrator lens 32.

Similarly, by the first light-blocking member 441 and the fifth light-blocking member 445 blocking the light emitted from a part of the outer edge portion 1312 included in the partial area 131a, it results that only the light emitted from the partial area 31a in the partial area 131a enters the second integrator lens 32. By the second light-blocking member 442 and the seventh light-blocking member 447 blocking the light emitted from a part of the outer edge portion 1312 included in the partial area 131b, it results that only the light emitted from the partial area 31b in the partial area 131b enters the second integrator lens 32. By the fourth light-blocking member 444 and the eighth light-blocking member 448 blocking the light emitted from a part of the outer edge portion 1312 included in the partial area 131d, it results that only the light emitted from the partial area 31d in the partial area 131d enters the second integrator lens 32.

According to the dimming device 440 related to the present embodiment provided with the configuration described above, it is possible to further suppress the illuminance ununiformity even in the case in which, for example, the light sources 10a through 10d are in the one-lamp lighting state as shown in FIG. 10A. Hereinafter, a detailed explanation will be presented.

Figure 12:
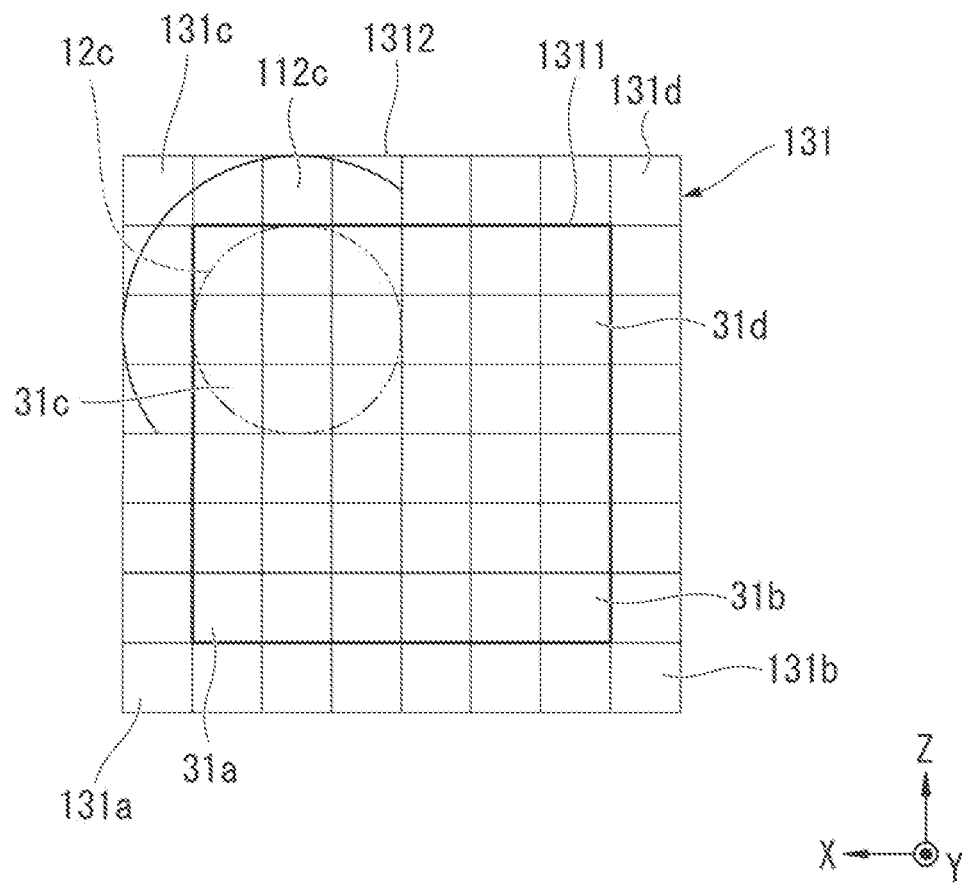
FIG. 12 is a diagram showing the state of lighting one lamp in the case of using the whole of the first integrator lens.

FIG. 12 is a diagram showing the first integrator lens 131 in the one-lamp lighting state. In FIG. 12, there is shown the state in which the light source 10c is lighted alone.

As shown in FIG. 12, for example, in the one-lamp lighting state, since the light entering the outer edge portion on the partial area 31a side (the −Z side) and the outer edge portion on the partial area 31d side (the −X side) out of the light dispersed outside the emitted light flux 12c is not guided to the outer edge portion by the light guide optical, system 20, there is obtained a distribution in which the central portion of the first integrator lens 131 is bright, and the outer portion is dark. As a result, the cross-sectional shape of the light emitted from the partial area 131c becomes asymmetric to cause the illuminance ununiformity.

With respect to the problem described above, according to the present embodiment, by partially blocking the light emitted from the first integrator lens 131 using the dimming device 440, the asymmetric property of the light thus emitted can be resolved. FIG. 10A shows the case in which the light source 10c is lighted alone, and the light sources 10a, 10b, and 10d are not lighted. On this occasion, the dimming control device 140 not shown performs the following dimming operation based on the detection information of the one-lamp lighting state.

As shown in FIG. 10A, the dimming control device 140 makes the third light-blocking member 443 and the sixth light-blocking member 446 corresponding to the partial area 131c (the area where the light emitted from the light source 10c enters) make the slide movement toward the inside to dispose the third light-blocking member 443 at a position opposed to the four small lenses in the outer edge portion 1312 arranged in the left side (the +X side) end portion of the partial area 131c, and dispose the sixth light-blocking member 446 at a position opposed to the four small lenses in the outer edge portion 1312 arranged in the upper side (the +Z side) end portion of the partial area 131c.

The rest of the light-blocking members can be arranged to be located outside the first integrator lens 131, or arranged at positions with the slide movement toward the inside in a similar manner to the case of the third light-blocking member 443 and the sixth light-blocking member 446. In FIG. 10A, the rest of the light-blocking members are arranged to be located outside the first integrator lens 131.

Thus, the cross-sectional shape of the light emitted from the partial area 131c becomes symmetric, and the light entering the overlapping lens 34 becomes to have a symmetric shape. Therefore, according to the present embodiment, the illuminance ununiformity can be inhibited from occurring.

It should be noted that since the light entering a part of the outer edge portion of each of the emitted light flux 112a through 112d is not guided to the outer edge portion by the light guide optical system 20 also in such a four-lamp lighting state as shown in FIG. 11, the cross-sectional shape of each of the emitted light flux 112a through 112d becomes asymmetric. However, in the four-lamp lighting state, since the asymmetric properties of the respective emitted light flux+112a through 112d are canceled out with each other, the illuminance ununiformity does not occur.

Dimming Operation in Two-Lamp Lighting State

Figure 13:
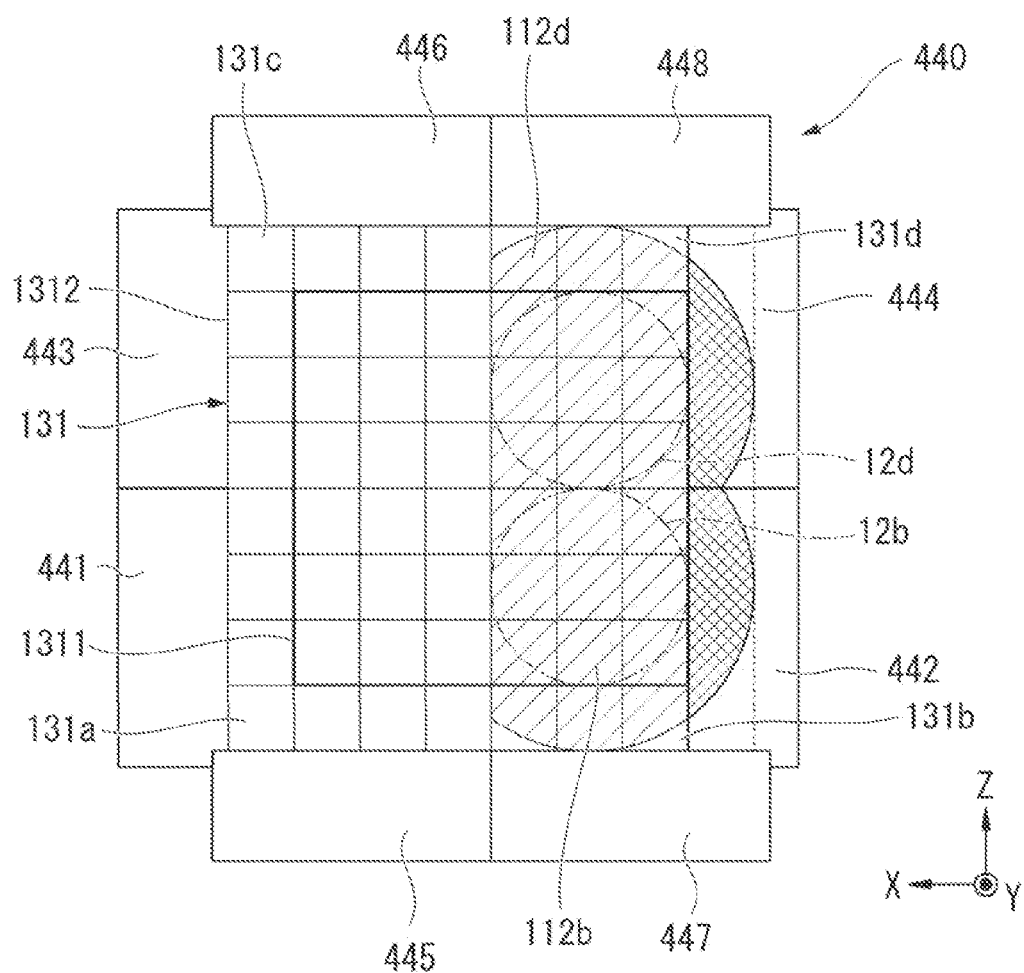
FIG. 13 is a diagram showing a dimming operation when lighting two lamps in the third embodiment.

According to the dimming device 440 of the present embodiment, the asymmetric property of the light to be emitted can be resolved also in such a two-lamp lighting state as shown in FIG. 13. FIG. 13 shows the case in which the light sources 10b, 10d are lighted, and the light sources 10a, 10c are not lighted.

In such a two-lamp lighting state as shown in FIG. 13, when overlapping the emitted light flux 112b, 112d with each other, the shape of the light flux is asymmetric with respect to the vertical direction (the Z-axis direction) in the drawing, and the shape of the light emitted from the first integrator lens 131 does not have a symmetric property.

On such an occasion, the dimming control device 140 not shown performs the following dimming operation based on the detection information of the two-lamp lighting state.

The dimming control device 140 makes the second light-blocking member 442 corresponding to the partial area 131b (the area where the light emitted from the light source 10b enters) make the slide movement toward the inside to dispose the second light-blocking member 442 in front of the four small lenses in the outer edge portion 1312 arranged in the right side (the −X side) end portion of the partial area 131b. Further, the dimming control device 140 makes the fourth light-blocking member 444 corresponding to the partial area 131d (the area where the light emitted from the light source 10d enters) make the slide movement toward the inside to dispose the fourth light-blocking member 444 in front of the four small lenses in the outer edge portion 1312 arranged in the right side (the −X side) end portion of the partial area 131d.

The rest of the light-blocking members can be arranged to be located outside the first integrator lens 131, or can be arranged at positions with the slide movement toward the inside. For example, in FIG. 13, the rest of the light-blocking members are arranged to be located outside the first integrator lens 131.

Thus, the cross-sectional shape of each of the emitted light flux 112b, 112d emitted from the partial areas 131b, 131d becomes line-symmetric with respect to the vertical direction (the Z-axis direction) in the drawing, and as a result, the shape of the light emitted from the first integrator lens 131 becomes to have a symmetric property. Therefore, by arranging the light-blocking members in such a manner as described above, the illuminance ununiformity can be inhibited from occurring.

Further, in the present embodiment, when overlapping the emitted light flux 112b, 112d with each other, the shape of the light flux is line-symmetric with respect to the lateral direction (the X-axis direction) in the drawing regardless of whether or not the dimming operation is performed. Therefore, it is not necessary to block the light emitted from the outer edge portion corresponding to the lower side (the −Z side) of the emitted light flux 112b and the outer edge portion corresponding to the upper side (the +Z side) of the emitted light flux 112d. As a result, the luminance of the projection image projected from the projector can be improved compared to the case in which the light is blocked in the entire outer edge portion of the first integrator lens 31 in the first embodiment and the second embodiment.

It should be noted that although in the explanation described above, the one-lamp lighting state and the two-lamp lighting state are explained, according to the present embodiment, the dimming operation can be performed also in, for example, the three-lamp lighting state so that the light entering the overlapping lens 34 becomes to have a shape having a symmetric property.

Fourth Embodiment

Figure 14A:
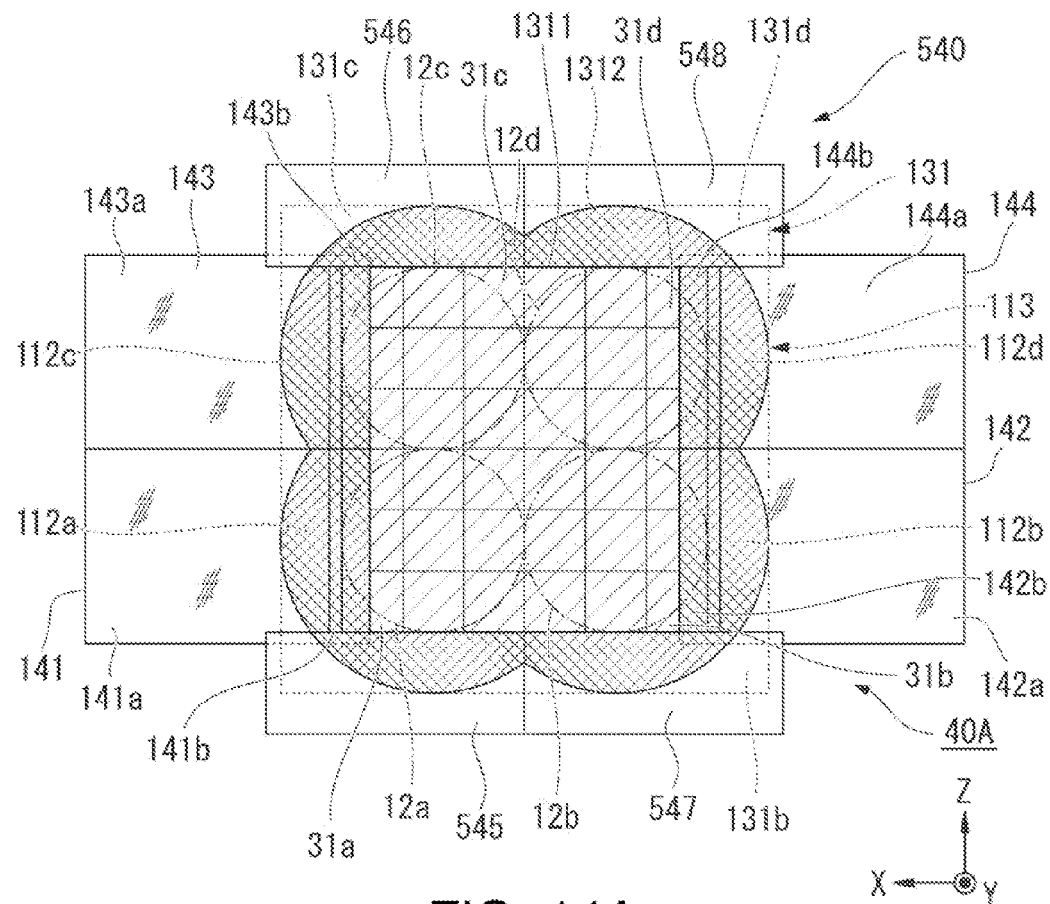
FIGS. 14A and 14B are diagrams showing an essential part of a projector according to a fourth embodiment of the invention.
Figure 14B:
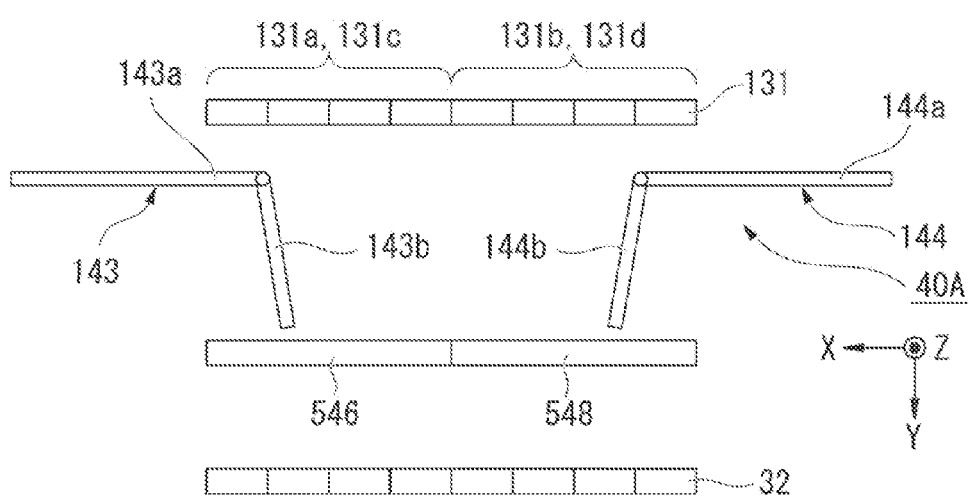

FIGS. 14A and 14B are diagrams showing an essential part of a projector according to a fourth embodiment of the invention.

The projector according to the fourth embodiment is provided with a dimming device 540 shown in FIGS. 14A and 14B in addition to the configuration of the second embodiment. The dimming device 540 according to the present embodiment is obtained by eliminating the first light-blocking member 441 through the fourth light-blocking member 444 from the dimming device 440 according to the third embodiment. The dimming device 540 is a device for performing the dimming operation based only on the lighting state of the light sources 10a through 10d.

Further, in the fourth embodiment, there is described the configuration of using the light emitted from the outer edge portion 1312 as the illumination light similarly to the third embodiment.

The dimming device 540 is provided with a fifth light-blocking member 545, a sixth light-blocking member 546, a seventh light-blocking member 547, and an eighth light-blocking member 548. The fifth light-blocking member 545 through the eighth light-blocking member 548 are connected to the dimming control device 140 not shown, and perform the dimming operation under the control of the dimming control device 140.

The fifth light-blocking member 545 is substantially the same as the fifth light-blocking member 445 in the third embodiment. The sixth light-blocking member 546 is substantially the same as the sixth light-blocking member 446 in the third embodiment. The seventh light-blocking member 547 is substantially the same as the seventh light-blocking member 447 in the third embodiment. The eighth light-blocking member 548 is substantially the same as the eighth light-blocking member 448 in the third embodiment.

As shown in FIG. 14B, the sixth light-blocking member 546 and the eighth light-blocking member 548 are disposed on the second integrator lens 32 side (the +Y side) of the dimming device 40A. The same applies to the fifth light-blocking member 545 and the seventh light-blocking member 547.

In the present embodiment, the first light-blocking plates 141a through 144a in the dimming device 40A also function as light-blocking members for blocking the light in the outer edge portion 1312 of the first integrator lens 131. In other words, the first light-blocking plates 141a through 144a of the dimming device 40A are also provided with dimming functions substantially the same as those of the first light-blocking member 441 through the fourth light-blocking member 444 in the third embodiment.

Thus, in the present embodiment, it is possible to perform both of the dimming operation of blocking the light emitted from the outer edge portion 1312 of the first integrator lens 131 based only on the lighting state of the light sources explained in the description of the third embodiment, and the dimming operation based on the lighting state of the light sources and the image data of the display image explained in the description of the first embodiment and the second embodiment.

In the dimming operation performed based only on the lighting state of the light sources, the light emitted from the outer edge portion 1312 is blocked so that the light entering the overlapping lens 34 becomes to have a shape with a symmetric property using the first light-blocking plates in the dimming device 40A and the dimming device 540 similarly to the third embodiment.

On the other hand, in the dimming operation based on the lighting state of the light sources and the image data of the display image, the light emitted from the outer edge portion 1312 of the first integrator lens 131 is blocked first, and then the dimming operation is performed by rotating the second light-blocking plates of the dimming device 40A similarly to the first embodiment and the second embodiment. This is because the light emitted from the first integrator lens 131 cannot completely be blocked only by rotating the second light-blocking plates in the state in which the light is emitted from the outer edge portion 1312. Hereinafter, the dimming operation based on the lighting state of the light sources and the image data of the display image will be explained in detail.

Dimming Operation in Four-Lamp Lighting State

In the projector according to the present embodiment, in the case of performing the dimming operation in the four-lamp lighting state shown in FIG. 14A, the dimming control device 140 not shown performs the following dimming operation based on detection information of the four-lamp lighting state and the image data of the display image.

Firstly, the dimming control device 140 makes the first light-blocking plates 141a through 144a of the first light-blocking member 141 through the fourth light-blocking member 144 and the fifth light-blocking member 545 through the eighth light-blocking member 548 make the slide movement toward the inside so as to be disposed at positions opposed to the corresponding small lenses in the outer edge portion 1312. Thus, the light emitted from the outer edge portion 1312 are blocked, and the light emitted from the first integrator lens 131 gets into the state in which the light is emitted only from the lens central portion 1311 formed of the small lenses arranged in the 6×6 matrix.

Subsequently, in the arrangement state described above, the dimming control device 140 rotates the second light-blocking plates 141b, 142b, 143b, and 144b to partially or wholly block the emitted light flux 12a, 12b, 12c, and 12d. On this occasion, the dimming control device 140 makes the second light-blocking plates 141b, 142b act symmetrically to each other so as to have the rotational angles roughly equivalent to each other, namely, so that the paired second light-blocking plates 141b, 142b equally block the emitted light flux 12a, 12b. Thus, the asymmetric properties of the light emitted from the lens elements partially blocked by the second light-blocking plates 141b, 142b are canceled out with each other, and thus the illuminance ununiformity is inhibited from occurring.

Further, the dimming control device 140 makes the second light-blocking plates 143b, 144b act symmetrically to each other so as to have the rotational angles roughly equivalent to each other, namely, so that the paired second light-blocking plates 143b, 144b equally block the emitted light flux 12c, 12d. Thus, the asymmetric properties of the light emitted from the lens elements partially blocked by the second light-blocking plates 143b, 144b are canceled out with each other, and thus the illuminance ununiformity is inhibited from occurring.

Dimming Operation in Three-Lamp Lighting State

Figure 15:
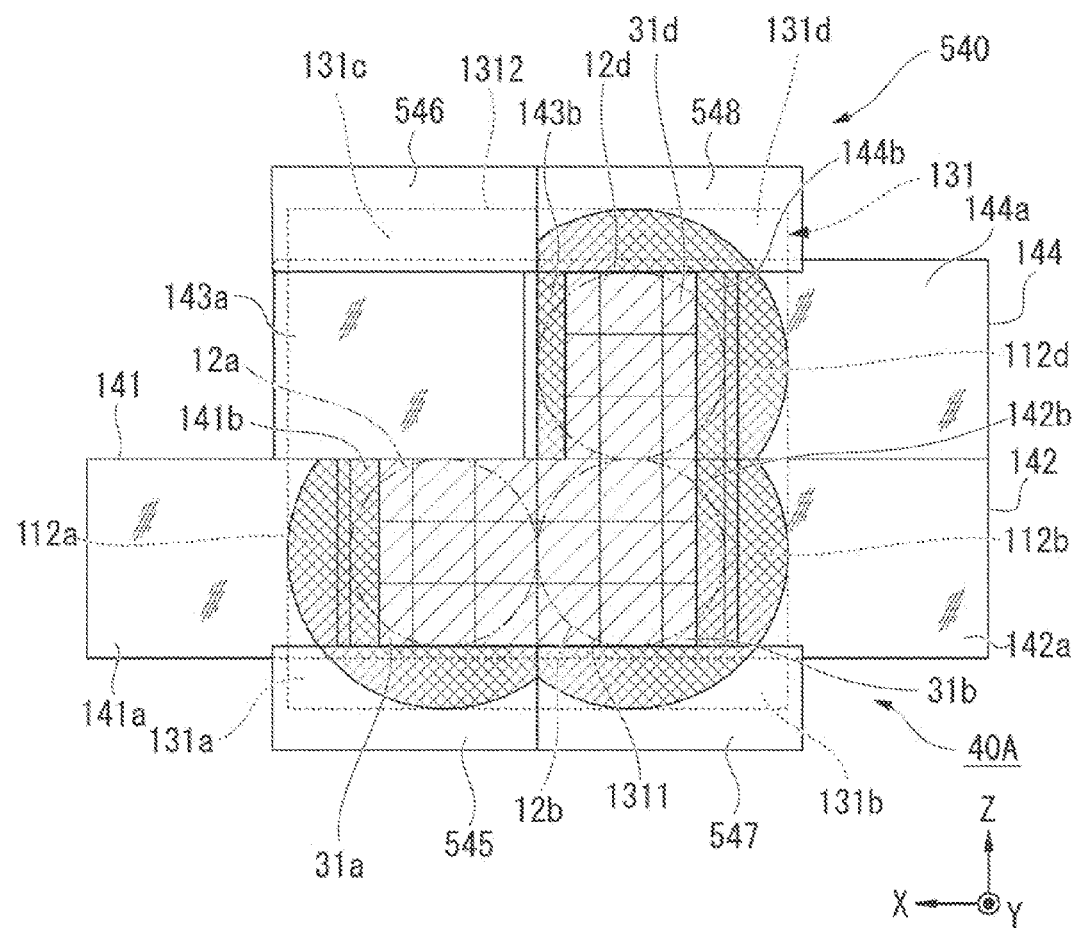
FIG. 15 is a diagram showing a dimming operation when lighting three lamps in the fourth embodiment.

FIG. 15 is a diagram showing the first integrator lens 131 in the three-lamp lighting state. FIG. 15 shows the case in which the light sources 10a, 10b, and 10d are lighted, and the light source 10c is not lighted. In this case, the dimming control device 140 performs the following dimming operation based on the detection information of the three-lamp lighting state and the image data of the display image.

Firstly, the dimming control device 140 makes the first light-blocking plates 141a through 144a of the first light-blocking member 141 through the fourth light-blocking member 144 and the fifth light-blocking member 545 through the eighth light-blocking member 548 make the slide movement toward the inside so as to be disposed at positions opposed to the corresponding small lenses in the outer edge portion 1312 similarly to the operation in the four-lamp lighting state described above. Then, the dimming control device 140 makes the first light-blocking plate 143a of the third light-blocking member 143 make a further slide movement toward the inside to be disposed at the position opposed to the partial area 131c corresponding to the light source 10c, which is not lighted, based on the detection information of the three-lamp lighting state.

Then, the dimming control device 140 controls the second light-blocking plates 141b through 144b of the dimming device 40A in a similar manner to the case shown in FIG. 7A to perform the dimming operation. Thus, the light entering the overlapping lens 34 becomes to have a shape with a symmetric property, and the illuminance ununiformity is inhibited from occurring.

Dimming Operation in One-Lamp Lighting State

Figure 16:
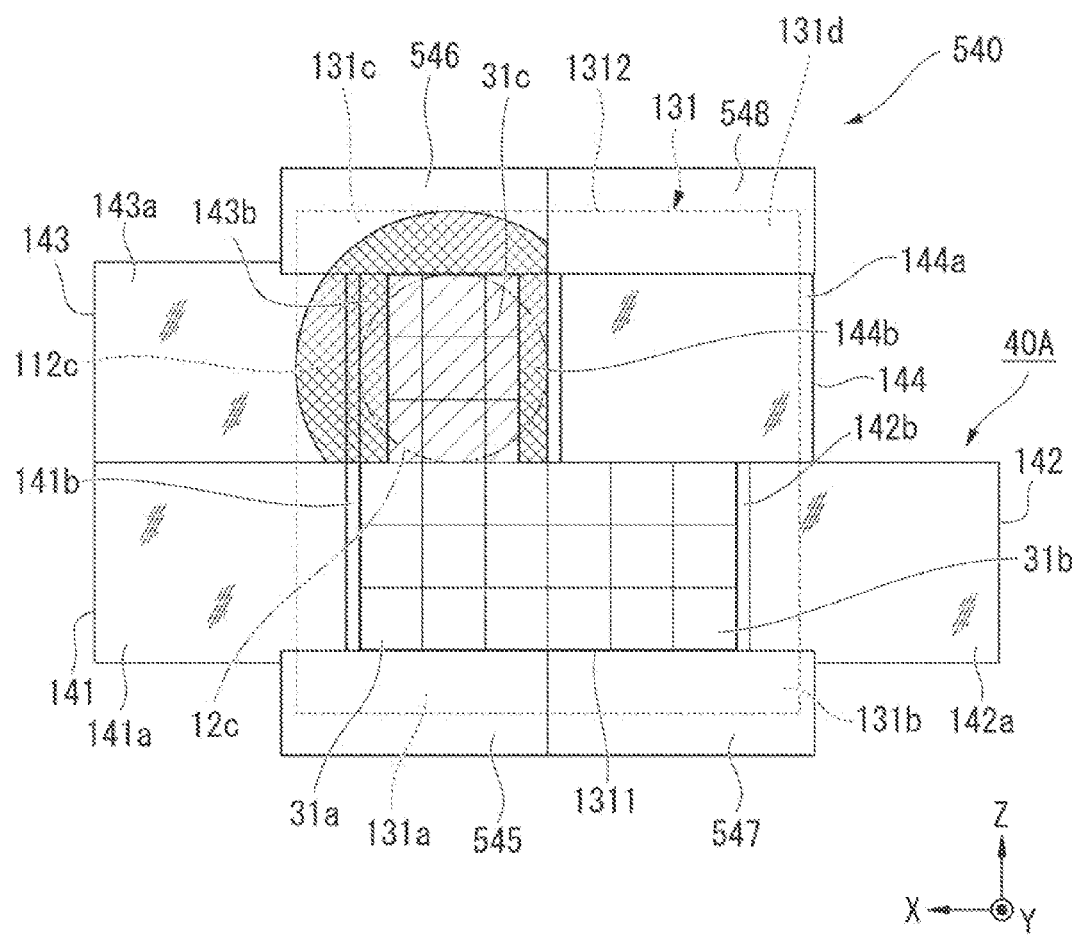
FIG. 16 is a diagram showing a dimming operation when lighting one lamp in the fourth embodiment.

FIG. 16 is a diagram showing the first integrator lens 131 in the one-lamp lighting state. FIG. 16 shows the case in which the light source 10c is lighted, and the light sources 10a, 10b, and 10d are not lighted. In this case, the dimming control device 140 not shown performs the following dimming operation based on the detection information of the one-lamp lighting state and the image data of the display image.

Firstly, the dimming control device 140 makes the first light-blocking plates 141a through 144a of the first light-blocking member 141 through the fourth light-blocking member 144 and the fifth light-blocking member 545 through the eighth light-blocking member 548 make the slide movement toward the inside so as to be disposed at positions opposed to the corresponding small lenses in the outer edge portion 1312 similarly to the operation in the four-lamp lighting state and the three-lamp lighting state described above. Then, the dimming control device 140 makes the first light-blocking plate 144a of the fourth light-blocking member 144 make a further slide movement toward the inside to be disposed at the position opposed to the partial area 131d corresponding to the light source 10d, which is not lighted, based on the detection information of the one-lamp lighting state.

Then, the dimming control device 140 rotates the second light-blocking plates 143b, 144b to partially or wholly block the emitted light flux 12c. On this occasion, the dimming control device 140 makes the second light-blocking plates 143b, 144b act symmetrically to each other so as to have the rotational angles roughly equivalent to each other, namely, so that the paired second light-blocking plates 143b, 144b equally block the emitted light flux 12c. Thus, the asymmetric properties of the light emitted from the lens elements partially blocked by the second light-blocking plates 143b, 144b are canceled out with each other, and thus the illuminance ununiformity is inhibited from occurring.

It should be noted that in the present embodiment, in the case of performing the dimming operation based on the image data of the display image, it is assumed that the light emitted from the outer edge portion 1312 is blocked first, and then the dimming operation using the second light-blocking plates is performed, but the invention is not limited to this configuration. In the present embodiment, it is also possible to perform the dimming operation of the light emitted from the first integrator lens 131 by rotating the second light-blocking plates 141b through 144b of the first light-blocking member 141 through the fourth light-blocking member 144 in the state in which, for example, the first light-blocking plates of the first light-blocking member 141 through the fourth light-blocking member 144, and the fifth light-blocking member 545 through the eighth light-blocking member 548 are located outside the first integrator lens 131. Further, in this case, it is also possible to control the slide movement of the fifth light-blocking member 545 through the eighth light-blocking member 548 in conjunction therewith to thereby control the transition between the state in which the light is emitted from the entire first integrator lens 131 and the state in which the light emitted from the first integrator lens 131 is completely blocked based on the image data of the display image.

Further, although in each of the embodiments described above, there is explained the configuration in which the dimming device is disposed between the first integrator lens and the second integrator lens, the invention is not limited to this configuration. The position where the dimming device is disposed is not particularly limited providing the position is in a range between the light sources 10a through 10d and the overlapping lens 34 on the light path, and the position can also be in a range, for example, between the light guide optical system 20 and the first integrator lens 31, 131 on the light path, or between the second integrator lens 32 and the overlapping lens 34 on the light path. In the case in which the dimming device is disposed between the light guide optical system 20 and the first integrator lens 31, 131 on the light path, the light on which has been controlled by the dimming device enters the first integrator lens 31, 131 when performing the dimming operation.

Further, although in each of the embodiments described above, it is assumed that the pair of light-blocking members (the first light-blocking member 41 and the second light-blocking member 42, the first light-blocking member 141 and the second light-blocking member 142, the third light-blocking member 143 and the fourth light-blocking member 144) block the light in a line-symmetric manner with respect to the lateral direction (the X-axis direction) in the drawing, the invention is not limited to this configuration. It is also possible to adopt a configuration of, for example, disposing a pair of light-blocking members above and below the first integrator lens 31, 131 in the drawing to block the light symmetrically with respect to the vertical direction of the drawing.

Further, although in each of the embodiments described above, an example of the case in which the invention is applied to the transmissive projector is explained, the invention can also be applied to reflective projectors. Here, "transmissive" denotes that the liquid crystal light valve including the liquid crystal panel and so on is a type of transmitting the light. Further, "reflective" denotes that the liquid crystal light valve is a type of reflecting the light. It should be noted that the light modulation device is not limited to the liquid crystal panel or the like, but can be a light modulation device using, for example, micro-mirrors.

Further, although in each of the embodiments described above, only the example of the projector 100 using three liquid crystal panels (the liquid crystal light valves 61 through 63), the invention can be applied to a projector using a single liquid crystal panel alone, or a projector using four or more liquid crystal panels.

The invention can be applied to a front projection projector for performing projection from the side of observing the projection image, and also to a rear projection projector for performing projection from the side opposite to the side of observing the projection image.

Although in each of the embodiments described above, the example of applying the light source device according to the invention to the projector is explained, the invention is not limited thereto. For example, the light source device according to the invention can also be applied to other optical equipment (e.g., a headlight of a vehicle, and an illumination device).

The entire disclosure of Japanese Patent Application No.: 2013-071589, filed Mar. 29, 2013 and 2014-015225, filed Jan. 30, 2014 are expressly incorporated by reference herein.

What is claimed is:

1. A projector comprising:
   a plurality of light sources;
   an integrator optical system including an integrator lens, and an overlapping lens adapted to overlap light emitted from the integrator lens;
   a light guide optical system adapted to guide light emitted from the respective light sources to partial areas of the integrator lens to thereby irradiate an entire area of the integrator lens;
   a light modulation device adapted to modulate the light emitted from the integrator optical system;

a projection optical system adapted to project the light modulated by the light modulation device; and a light control device disposed on a light path of the light emitted from the light sources between the light sources and the overlapping lens, the light control device including:

a pair of light-blocking members opposed to each other across the light path in one direction in which the plurality of partial areas is arranged on the integrator lens, each light-blocking member including a first light blocker and a second light blocker; and a control device adapted to move the light-blocking members into and out of the light path so that the light entering the overlapping lens has a shape with a symmetric property in accordance with lighting and extinction states of the plurality of light sources, wherein for each light-blocking member, in a first position of the first light blocker, the second light blocker moves into a light path of a first partial area of the integrator lens, and in a second position of the first light blocker, the second light blocker moves into a light path of a second partial area of the integrator lens.

2. The projector according to claim 1, wherein
the control device moves the pair of light-blocking members into and out of the light path so that the pair of light-blocking members evenly block the light emitted from the light sources.

3. The projector according to claim 1, wherein
each of the light-blocking members block at least a part of the light emitted from the partial area located at a furthest position from the light-blocking member itself in the one direction.

4. The projector according to claim 1, wherein
the light-blocking members each block a part of an outer edge portion of the light emitted from the light source.

5. The projector according to claim 1, wherein
a number of the light sources is one of equal to and larger than four,
a number of the partial areas arranged on the integrator lens in a row direction is one of equal to and larger than two,
a number of the partial areas arranged on the integrator lens in a column direction is one of equal to and larger than two, and
the light control device has a pair of the light-blocking members corresponding to the plurality of partial areas arranged in the row direction for each of the rows.

6. The projector according to claim 1, wherein
the control device includes a slide mechanism adapted to make slide movements of the light-blocking members.

7. The projector according to claim 6, wherein
for each of the light-blocking members, the first lighter blocker is a first light-blocking plate connected to the slide mechanism, and the second light blocker is a second light-blocking plate connected to the first light-blocking plate via one of a rotation mechanism and another slide mechanism.

8. An illumination device comprising:
a plurality of light sources;
an integrator optical system including an integrator lens, and an overlapping lens adapted to overlap light emitted from the integrator lens;
a light guide optical system adapted to guide light emitted from the respective light sources to partial areas of the integrator lens to thereby irradiate an entire area of the integrator lens; and
a light control device disposed on a light path of the light emitted from the light sources between the light sources and the overlapping lens, the light control device including;

a pair of light-blocking members opposed to each other across the light path in one direction in which the plurality of partial areas is arranged on the integrator lens, each light-blocking member including a first light blocker and a second light blocker; and a control device adapted to move the light-blocking members into and out of the light path so that the light entering the overlapping lens has a shape with a symmetric property in accordance with lighting and extinction states of the plurality of light sources, wherein for each light-blocking member, in a first position of the first light blocker, the second light blocker moves into a light path of a first partial area of the integrator lens, and in a second position of the first light blocker, the second light blocker moves into a light path of a second partial area of the integrator lens.

9. The illumination device according to claim 8, wherein
the control device moves the pair of light-blocking members into and out of the light path so that the pair of light-blocking members evenly block the light emitted from the light sources.

10. The illumination device according to claim 8, wherein
each of the light-blocking members block at least a part of the light emitted from the partial area located at a furthest position from the light-blocking member itself in the one direction.

11. The illumination device according to claim 8, wherein
the light-blocking members each block a part of an outer edge portion of the light emitted from the light source.

\* \* \* \* \*